(12) United States Patent
Dong et al.

(10) Patent No.: US 12,293,126 B2
(45) Date of Patent: May 6, 2025

(54) DEVICE CAPABILITY DISCOVERY METHOD AND P2P DEVICE

(71) Applicant: HUAWEI TECHNOLOGIES CO., LTD., Guangdong (CN)

(72) Inventors: Binbin Dong, Wuhan (CN); Ji Huang, Wuhan (CN); Yong Chen, Wuhan (CN); Jin Li, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 468 days.

(21) Appl. No.: 17/634,094

(22) PCT Filed: Aug. 4, 2020

(86) PCT No.: PCT/CN2020/106769
§ 371 (c)(1),
(2) Date: Feb. 9, 2022

(87) PCT Pub. No.: WO2021/027623
PCT Pub. Date: Feb. 18, 2021

(65) Prior Publication Data
US 2022/0353665 A1 Nov. 3, 2022

(30) Foreign Application Priority Data

Aug. 10, 2019 (CN) .......................... 201910737030.3

(51) Int. Cl.
*H04W 8/24* (2009.01)
*G06F 3/14* (2006.01)
(Continued)

(52) U.S. Cl.
CPC .......... *G06F 3/1454* (2013.01); *H04L 67/104* (2013.01); *H04W 8/005* (2013.01);
(Continued)

(58) Field of Classification Search
CPC ....... H04W 8/005; H04W 8/24; H04W 84/12; G06F 3/0482
(Continued)

(56) References Cited

U.S. PATENT DOCUMENTS 8,130,686 B2 * 3/2012 Rao ........................ H04L 12/189
370/312
8,639,220 B2 * 1/2014 Choi ...................... H04W 12/50
455/411

(Continued)

FOREIGN PATENT DOCUMENTS

CN 102907125 A 1/2013
CN 103109552 A 5/2013
(Continued)

OTHER PUBLICATIONS

W Yang et al, An effective service discovery approach based on field theory and contribution degree in unstructured P2P network, 2015, 2 pages.

(Continued)

*Primary Examiner* — Anthony Mejia
(74) *Attorney, Agent, or Firm* — WOMBLE BOND DICKINSON (US) LLP

(57) ABSTRACT

A device capability discovery method and a P2P device are provided, and relate to the communications field and the distributed hardware field, to shorten time consumed to obtain capability information of a discovered device. A P2P device receives a probe request frame from another device. The P2P device returns a probe response frame including capability information of the P2P device. A device that receives the probe response frame can obtain a capability of the device in a device discovery phase. Alternatively, a P2P device sends a probe request frame including capability information of the P2P device to another device, so that the (Continued)

another device can obtain a capability of the device in a device discovery phase.

17 Claims, 17 Drawing Sheets

(51) Int. Cl.
*H04L 67/104* (2022.01)
*H04W 8/00* (2009.01)
*G06F 3/0482* (2013.01)
*H04W 84/12* (2009.01)

(52) U.S. Cl.
CPC ............ *H04W 8/24* (2013.01); *G06F 3/0482* (2013.01); *H04W 84/12* (2013.01)

(58) Field of Classification Search
USPC ......................................................... 370/338
See application file for complete search history.

(56) References Cited

U.S. PATENT DOCUMENTS

| | | | | |
|---|---|---|---|---|
| 10,699,576 B1* | 6/2020 | Shih | ............. | G08G 1/163 |
| 11,128,703 B2* | 9/2021 | Virani | ............. | H04W 4/023 |
| 12,082,301 B2* | 9/2024 | Lumbatis | ............. | H04L 5/0044 |
| 2007/0264991 A1* | 11/2007 | Jones | ............. | H04M 1/72412 |
| | | | | 455/420 |
| 2009/0214039 A1* | 8/2009 | Chen | ............. | H04W 8/186 |
| | | | | 380/270 |
| 2013/0234913 A1* | 9/2013 | Thangadorai | ......... | G06F 3/1423 |
| | | | | 345/2.1 |
| 2014/0113595 A1 | 4/2014 | Choi et al. | | |
| 2015/0124792 A1* | 5/2015 | Gix | ............. | H04W 4/80 |
| | | | | 370/338 |
| 2015/0172905 A1* | 6/2015 | Qi | ............. | H04L 67/1061 |
| | | | | 370/338 |
| 2016/0241994 A1* | 8/2016 | Iguchi | ............. | H04W 4/029 |
| 2017/0006117 A1* | 1/2017 | Kafle | ............. | H04L 65/612 |
| 2017/0215113 A1* | 7/2017 | Lee | ............. | H04W 4/80 |
| 2017/0223615 A1* | 8/2017 | Lee | ............. | H04W 52/02 |
| 2018/0242135 A1* | 8/2018 | Lee | ............. | H04W 8/005 |
| 2020/0211073 A1* | 7/2020 | Kim | ............. | H04L 12/2807 |
| 2021/0014909 A1* | 1/2021 | Kim | ............. | H04L 41/0803 |

FOREIGN PATENT DOCUMENTS

| | | |
|---|---|---|
| CN | 104704906 A | 6/2015 |
| CN | 105917725 A | 8/2016 |
| CN | 106357485 A | 1/2017 |
| CN | 107005797 A | 8/2017 |
| CN | 109923900 A | 6/2019 |
| EP | 2422572 A2 | 2/2012 |
| EP | 2497286 A1 | 9/2012 |
| EP | 2645781 A2 | 10/2013 |
| KR | 20180040505 A | 4/2018 |
| WO | 2010123683 A2 | 10/2010 |
| WO | 2014189752 A1 | 11/2014 |
| WO | 2015130343 A1 | 9/2015 |
| WO | WO-2021027623 A1 * | 2/2021 ........... G06F 3/1454 |

OTHER PUBLICATIONS

IEEE Std 802.11-2012, IEEE Standard for Information technology-Telecommunications and information exchange between systems Local and metropolitan area networks-Specific requirements, Part 11: Wireless LAN Medium Access Control (MAC) and Physical Layer (PHY) Specifications, Approved Feb. 6, 2012, 2793 pages.
Ma Qianli et al, SIGSDP : a service information guided service discovery protocolin pervasive environments, 2009, 7 pages.

* cited by examiner

DEVICE CAPABILITY DISCOVERY METHOD AND P2P DEVICE

CROSS-REFERENCE TO RELATED APPLICATIONS

This application is a national stage of International Application No. PCT/CN2020/106769, filed on Aug. 4, 2020, which claims priority to Chinese Patent Application No. 201910737030.3, filed on Aug. 10, 2019. Both of the aforementioned applications are hereby incorporated by reference in their entireties.

TECHNICAL FIELD

This application relates to the communications field, and in particular, to a device capability discovery method and a P2P device.

BACKGROUND

A wireless fidelity (Wi-Fi) technology is a wireless local area network technology created by the Wi-Fi Alliance according to the Institute of Electrical and Electronics Engineers (IEEE) 802.11 standard. Wi-Fi peer-to-peer (P2P), or referred to as Wi-Fi direct, is an important technical specification created by the Wi-Fi Alliance in this technology. A device supporting Wi-Fi P2P can discover, according to the Wi-Fi P2P technical specification, another nearby device supporting Wi-Fi P2P, and establish a Wi-Fi P2P connection to the discovered device for data transmission without a hotspot or a router.

Currently, after discovering a device, a device supporting Wi-Fi P2P may obtain capability information of the device through a device service discovery process specified in the IEEE 802.11 standard. However, this method consumes relatively long time to obtain the capability information of the discovered device.

SUMMARY

Embodiments of the application provide a device capability discovery method and a P2P device, to shorten time consumed to obtain capability information of a discovered device.

To achieve the foregoing objective, the following technical solutions are applied to the embodiments of the application.

According to a first aspect, an embodiment of the application provides a device capability discovery method. The method may be performed by a first P2P device supporting Wi-Fi P2P, and the method includes: The first P2P device sends a probe request frame; and the first P2P device receives a probe response frame from a second P2P device, where the probe response frame includes capability information of the second P2P device, the capability information of the second P2P device is used to indicate a capability supported by the second P2P device, and the second P2P device supports the Wi-Fi P2P.

According to the technical solution, the P2P device sends the probe response frame including the capability information of the P2P device to the another P2P device, so that the device can obtain the capability information of the discovered device in a device discovery phase. Less time is consumed to discover capability information of a device compared with time consumed to obtain the capability information of the device through a device service discovery process after the device is discovered.

In an embodiment, a capability supported by a device includes at least one of the following: a shooting capability, a display capability, an audio play capability, and an audio capture capability.

In an embodiment, the method may further include: The first P2P device displays an available device list, where the available device list may include at least one sub-item, the sub-item includes identifiers of devices discovered by the first P2P device, and the devices discovered by the first P2P device include the second P2P device. The first P2P device displays an identifier of the second P2P device in the available device list based on the received capability information of the second P2P device, where devices corresponding to all identifiers included in a same sub-item support a same capability, and devices corresponding to identifiers included in different sub-items support different capabilities. In this way, after the capability information of the device is obtained, the identifier of the discovered device may be displayed in a corresponding sub-item based on the capability information of the device, so that a user can quickly identify a device that meets a condition (for example, a device corresponding to a to-be-used function), to quickly select an appropriate device to establish a Wi-Fi P2P connection to the device for data transmission.

In some embodiments, the identifier of the device included in the sub-item may include at least one of the following: a name of the device, an icon corresponding to a capability, a location of the device (for example, in a user's home, the location of the device may be a living room, a main bedroom, a second bedroom, or a kitchen), and an icon indicating a device type.

In an embodiment, if a device discovered by the first P2P device supports a plurality of capabilities, a sub-item corresponding to each capability includes an identifier of the device discovered by the first P2P device. In this way, the user can more clearly, conveniently, and quickly use capabilities of a P2P device supporting a plurality of capabilities.

In an embodiment, a frame body of the probe response frame includes the capability information of the second P2P device.

In an embodiment, the probe request frame may include capability information of the first P2P device, and the capability information of the first P2P device is used to indicate a capability supported by the first P2P device. In this way, the another P2P device can obtain the capability information of the first P2P device in the device discovery phase, to shorten time consumed by the another P2P device to obtain the capability information of the discovered device.

In an embodiment, a frame body of the probe request frame includes the capability information of the first P2P device.

In an embodiment, that the first P2P device sends a probe request frame may include: The first P2P device sends the probe request frame in a search state.

In an embodiment, the method may further include: The first P2P device sends a probe request frame in a scan phase, where the probe request frame sent in the scan phase includes the capability information of the first P2P device.

According to a second aspect, an embodiment of the application provides a device capability discovery method. The method may be performed by a second P2P device supporting Wi-Fi P2P, and the method includes: The second P2P device receives a probe request frame from a first P2P device, where the first P2P device supports the Wi-Fi P2P;

and the second P2P device sends a probe response frame to the first P2P device, where the probe response frame includes capability information of the second P2P device, and the capability information of the second P2P device is used to indicate a capability supported by the second P2P device.

According to the technical solution, the P2P device sends the probe response frame including the capability information of the P2P device to the another P2P device, so that the device can obtain the capability information of the discovered device in a device discovery phase. Less time is consumed to discover capability information of a device compared with time consumed to obtain the capability information of the device through a device service discovery process after the device is discovered.

In an embodiment, a capability supported by a device includes at least one of the following: a shooting capability, a display capability, an audio play capability, and an audio capture capability.

In an embodiment, a frame body of the probe response frame includes the capability information of the second P2P device.

In an embodiment, the probe request frame includes capability information of the first P2P device, and the capability information of the first P2P device is used to indicate a capability supported by the first P2P device. In this way, the another P2P device such as the second P2P device can obtain the capability information of the first P2P device in the device discovery phase, to shorten time consumed by the another P2P device to obtain the capability information of the discovered device.

In an embodiment, a frame body of the probe request frame includes the capability information of the first P2P device.

According to a third aspect, an embodiment of the application provides a device capability discovery method. The method may be performed by a first P2P device supporting Wi-Fi P2P, and the method includes: The first P2P device receives a first probe request frame from a second P2P device, where the first probe request frame includes capability information of the second P2P device, the capability information of the second P2P device is used to indicate a capability supported by the second P2P device, and the second P2P device supports the Wi-Fi P2P. The first P2P device sends a first probe response frame to the second P2P device.

According to the technical solution, the P2P device sends the probe request frame including the capability information of the P2P device to the another P2P device, so that the device can obtain the capability information of the discovered device in a device discovery phase. Less time is consumed to discover capability information of a device compared with time consumed to obtain the capability information of the device through a device service discovery process after the device is discovered.

In an embodiment, a capability supported by a device includes at least one of the following: a shooting capability, a display capability, an audio play capability, and an audio capture capability.

In an embodiment, the method may further include: The first P2P device sends a second probe request frame. The first P2P device receives a second probe response frame from the second P2P device. The first P2P device displays an available device list, where the available device list includes at least one sub-item, the sub-item includes identifiers of devices discovered by the first P2P device, and the devices discovered by the first P2P device include the second P2P device. The first P2P device displays an identifier of the second P2P device in the available device list based on the received capability information of the second P2P device, where devices corresponding to all identifiers included in a same sub-item support a same capability, and devices corresponding to identifiers included in different sub-items support different capabilities. In this way, after the capability information of the device is obtained, the identifier of the discovered device may be displayed in a corresponding sub-item based on the capability information of the device, so that a user can quickly identify a device that meets a condition (for example, a device corresponding to a to-be-used function), to quickly select an appropriate device to establish a Wi-Fi P2P connection to the device for data transmission.

In an embodiment, if a device discovered by the first P2P device supports a plurality of capabilities, a sub-item corresponding to each capability includes an identifier of the device discovered by the first P2P device. In this way, the user can more clearly, conveniently, and quickly use capabilities of a P2P device supporting a plurality of capabilities.

In an embodiment, a frame body of the first probe request frame includes the capability information of the second P2P device.

In an embodiment, the first probe response frame includes capability information of the first P2P device, and the capability information of the first P2P device is used to indicate a capability supported by the first P2P device. In this way, the another P2P device can obtain the capability information of the first P2P device in the device discovery phase, to shorten time consumed by the another P2P device to obtain the capability information of the discovered device.

In an embodiment, a frame body of the first probe response frame includes the capability information of the first P2P device.

In an embodiment, that the first P2P device sends a second probe request frame may include: The first P2P device sends the second probe request frame in a search state.

In an embodiment, the method may further include: The first P2P device sends a third probe request frame in a scan phase, where the third probe request frame includes the capability information of the first P2P device.

According to a fourth aspect, an embodiment of the application provides a device capability discovery method. The method may be performed by a second P2P device supporting Wi-Fi P2P, and the method may include: The second P2P device sends a first probe request frame, where the first probe request frame includes capability information of the second P2P device, and the capability information of the second P2P device is used to indicate a capability supported by the second P2P device. The second P2P device receives a first probe response frame from a first P2P device, where the first P2P device supports the Wi-Fi P2P.

According to the technical solution, the P2P device sends the probe request frame including the capability information of the P2P device to the another P2P device, so that the device can obtain the capability information of the discovered device in a device discovery phase. Less time is consumed to discover capability information of a device compared with time consumed to obtain the capability information of the device through a device service discovery process after the device is discovered.

In an embodiment, a capability supported by a device includes at least one of the following: a shooting capability, a display capability, an audio play capability, and an audio capture capability.

In an embodiment, the method may further include: The second P2P device receives a second probe request frame from the first P2P device, and sends a second probe response frame to the first P2P device. Then, the first P2P device discovers the second P2P device. In this way, the first P2P device can display an identifier of the second P2P device in an available device list based on the received capability information of the second P2P device. The available device list may include at least one sub-item, and the sub-item includes identifiers of devices discovered by the first P2P device. Devices corresponding to all identifiers included in a same sub-item support a same capability, and devices corresponding to identifiers included in different sub-items support different capabilities. In addition, if a device discovered by the first P2P device supports a plurality of capabilities, a sub-item corresponding to each capability includes an identifier of the device discovered by the first P2P device.

In an embodiment, a frame body of the first probe request frame includes the capability information of the second P2P device.

In an embodiment, the first probe response frame includes capability information of the first P2P device, and the capability information of the first P2P device is used to indicate a capability supported by the first P2P device. In this way, the another P2P device such as the second P2P device can obtain the capability information of the first P2P device in the device discovery phase, to shorten time consumed by the another P2P device to obtain the capability information of the discovered device.

In an embodiment, a frame body of the first probe response frame includes the capability information of the first P2P device.

According to a fifth aspect, an embodiment of the application provides a P2P device. The P2P device may be the first P2P device, the P2P device may include a Wi-Fi module, a memory, and one or more processors, and the Wi-Fi module supports Wi-Fi P2P. The Wi-Fi module, the memory, and the processor are coupled. The memory is configured to store computer program code, the computer program code includes computer instructions, and when the processor executes the computer instructions, the P2P device performs the method according to any one of the first aspect or the possible implementations of the first aspect, or the third aspect or the possible implementations of the third aspect.

According to a sixth aspect, an embodiment of the application provides a P2P device. The P2P device may be the second P2P device, the P2P device may include a Wi-Fi module, a memory, and one or more processors, and the Wi-Fi module supports Wi-Fi P2P. The Wi-Fi module, the memory, and the processor are coupled. The memory is configured to store computer program code, the computer program code includes computer instructions, and when the processor executes the computer instructions, the P2P device performs the method according to any one of the second aspect or the possible implementations of the second aspect, or the fourth aspect or the possible implementations of the fourth aspect.

According to a seventh aspect, an embodiment of the application provides a chip system. The chip system is used in a P2P device including a Wi-Fi module, for example, the first P2P device, and the Wi-Fi module supports Wi-Fi P2P. The chip system includes one or more interface circuits and one or more processors. The interface circuit and the processor are interconnected through a line. The interface circuit is configured to receive a signal from a memory of the P2P device, and send the signal to the processor, where the signal includes computer instructions stored in the memory. When the processor executes the computer instructions, the P2P device performs the method according to any one of the first aspect or the possible implementations of the first aspect, or the third aspect or the possible implementations of the third aspect.

According to an eighth aspect, an embodiment of the application provides a chip system. The chip system is used in a P2P device including a Wi-Fi module, for example, the second P2P device, and the Wi-Fi module supports Wi-Fi P2P. The chip system includes one or more interface circuits and one or more processors. The interface circuit and the processor are interconnected through a line. The interface circuit is configured to receive a signal from a memory of the P2P device, and send the signal to the processor, where the signal includes computer instructions stored in the memory. When the processor executes the computer instructions, the P2P device performs the method according to any one of the second aspect or the possible implementations of the second aspect, or the fourth aspect or the possible implementations of the fourth aspect.

According to a ninth aspect, an embodiment of the application provides a computer storage medium including computer instructions. When the computer instructions are run on a P2P device (for example, the first P2P device) supporting Wi-Fi P2P, the P2P device is enabled to perform the method according to any one of the first aspect or the possible implementations of the first aspect, or the third aspect or the possible implementations of the third aspect.

According to a tenth aspect, an embodiment of the application provides a computer storage medium including computer instructions. When the computer instructions are run on a P2P device (for example, the second P2P device) supporting Wi-Fi P2P, the P2P device is enabled to perform the method according to any one of the second aspect or the possible implementations of the second aspect, or the fourth aspect or the possible implementations of the fourth aspect.

According to an eleventh aspect, an embodiment of the application provides a computer program product. When the computer program product runs on a computer, the computer is enabled to perform the method according to any one of the first aspect or the possible implementations of the first aspect, or the second aspect or the possible implementations of the second aspect, or the third aspect or the possible implementations of the third aspect, or the fourth aspect or the possible implementations of the fourth aspect.

According to a twelfth aspect, an embodiment of the application provides a Wi-Fi chip. The Wi-Fi chip supports Wi-Fi P2P, and the Wi-Fi chip is used in a P2P device, for example, the first P2P device. The Wi-Fi chip includes one or more interface circuits and one or more processors. The interface circuit and the processor are interconnected through a line. The interface circuit is configured to receive a signal from a memory of the P2P device, and send the signal to the processor, where the signal includes computer instructions stored in the memory. When the processor executes the computer instructions, the P2P device performs the method according to any one of the first aspect or the possible implementations of the first aspect, or the third aspect or the possible implementations of the third aspect.

According to a thirteenth aspect, an embodiment of the application provides a Wi-Fi chip. The Wi-Fi chip supports Wi-Fi P2P, and the Wi-Fi chip is used in a P2P device, for example, the second P2P device. The Wi-Fi chip includes one or more interface circuits and one or more processors. The interface circuit and the processor are interconnected through a line. The interface circuit is configured to receive a signal from a memory of the P2P device, and send the signal to the processor, where the signal includes computer instructions stored in the memory. When the processor executes the computer instructions, the P2P device performs the method according to any one of the second aspect or the possible implementations of the second aspect, or the fourth aspect or the possible implementations of the fourth aspect.

According to a fourteenth aspect, an embodiment of the application provides a chip. The chip includes a Wi-Fi function, the Wi-Fi function may include a Wi-Fi P2P function, and the chip is used in a P2P device, for example, the first P2P device. The chip may enable, based on an instruction of a processor of the P2P device, the P2P device to perform the method according to any one of the first aspect or the possible implementations of the first aspect, or the third aspect or the possible implementations of the third aspect.

According to a fifteenth aspect, an embodiment of the application provides a chip. The chip includes a Wi-Fi function, the Wi-Fi function may include a Wi-Fi P2P function, and the chip is used in a P2P device, for example, the second P2P device. The chip may enable, based on an instruction of a processor of the P2P device, the P2P device to perform the method according to any one of the second aspect or the possible implementations of the second aspect, or the fourth aspect or the possible implementations of the fourth aspect.

According to a sixteenth aspect, an embodiment of the application provides a device capability discovery system. The device capability discovery system may include a first P2P device and a second P2P device, and both the first P2P device and the second P2P device support Wi-Fi P2P. The first P2P device is configured to send a probe request frame. The second P2P device is configured to receive the probe request frame from the first P2P device, and send a probe response frame to the first P2P device. The first P2P device is further configured to receive the probe response frame from the second P2P device, where the probe response frame includes capability information of the second P2P device, and the capability information of the second P2P device is used to indicate a capability supported by the second P2P device.

In an embodiment, a capability supported by a device includes at least one of the following: a shooting capability, a display capability, an audio play capability, and an audio capture capability.

In an embodiment, the first P2P device is further configured to display an available device list, where the available device list includes at least one sub-item, the sub-item includes identifiers of devices discovered by the first P2P device, and the devices discovered by the first P2P device include the second P2P device. The first P2P device displays an identifier of the second P2P device in the available device list based on the received capability information of the second P2P device, where devices corresponding to all identifiers included in a same sub-item support a same capability, and devices corresponding to identifiers included in different sub-items support different capabilities.

In an embodiment, if a device discovered by the first P2P device supports a plurality of capabilities, a sub-item corresponding to each capability includes an identifier of the device discovered by the first P2P device.

According to a seventeenth aspect, an embodiment of the application provides a device capability discovery system. The device capability discovery system may include a first P2P device and a second P2P device, and both the first P2P device and the second P2P device support Wi-Fi P2P. The second P2P device is configured to send a first probe request frame, where the first probe request frame includes capability information of the second P2P device, and the capability information of the second P2P device is used to indicate a capability supported by the second P2P device. The first P2P device is configured to receive the first probe request frame from the second P2P device, and send a first probe response frame to the second P2P device. The second P2P device is further configured to receive the first probe response frame from the first P2P device.

In an embodiment, a capability supported by a device includes at least one of the following: a shooting capability, a display capability, an audio play capability, and an audio capture capability.

In an embodiment, the first P2P device is further configured to send a second probe request frame. The second P2P device is further configured to receive the second probe request frame from the first P2P device, and send a second probe response frame to the first P2P device. The first P2P device is further configured to receive the second probe response frame from the second P2P device, and display an available device list, where the available device list includes at least one sub-item, the sub-item includes identifiers of devices discovered by the first P2P device, and the devices discovered by the first P2P device include the second P2P device. The first P2P device displays an identifier of the second P2P device in the available device list based on the received capability information of the second P2P device, where devices corresponding to all identifiers included in a same sub-item support a same capability, and devices corresponding to identifiers included in different sub-items support different capabilities.

In an embodiment, if a device discovered by the first P2P device supports a plurality of capabilities, a sub-item corresponding to each capability includes an identifier of the device discovered by the first P2P device.

According to an eighteenth aspect, an embodiment of the application provides a device capability discovery method. The method may be performed by a first P2P device that supports Wi-Fi P2P, and the method includes:

The first P2P device receives an operation of enabling a Wi-Fi P2P function of the first P2P device by a user. The first P2P device may display an available device list, where the available device list may include at least one sub-item, and the sub-item includes identifiers of devices discovered by the first P2P device. The first P2P device displays an identifier of a P2P device discovered by the first P2P device in the available device list based on capability information of the discovered P2P device, where devices corresponding to all identifiers included in a same sub-item support a same capability, and devices corresponding to identifiers included in different sub-items support different capabilities.

According to the technical solution, the P2P device may display the identifier of the discovered device in a corresponding sub-item based on the capability information of the device, so that a user can quickly identify a device that meets a condition (for example, a device corresponding to a to-be-used function), to quickly select an appropriate device to establish a Wi-Fi P2P connection to the device for data transmission.

In an embodiment, the identifier of the device included in the sub-item may include at least one of the following: a name of the device, an icon corresponding to a capability, a location of the device (for example, in a user's home, the location of the device may be a living room, a main bedroom, a second bedroom, or a kitchen), and an icon indicating a device type.

In an embodiment, if a device discovered by the first P2P device supports a plurality of capabilities, a sub-item corresponding to each capability includes an identifier of the device discovered by the first P2P device. In this way, the user can more clearly, conveniently, and quickly use capabilities of a P2P device supporting a plurality of capabilities.

In an embodiment, that the first P2P device receives an operation of enabling a Wi-Fi P2P function of the first P2P device by a user includes: The first P2P device receives an operation of enabling a Wi-Fi direct connection function by the user, or the first P2P device receives an operation of enabling a screen projection function by the user, or the first P2P device receives an operation of enabling an instant sharing function (for example, Huawei share) by the user.

It may be understood that for beneficial effects that can be achieved by the P2P devices according to the fifth aspect and the sixth aspect, the chip systems according to the seventh aspect and the eighth aspect, the computer storage media according to the ninth aspect and the tenth aspect, the computer program product according to the eleventh aspect, the Wi-Fi chips according to the twelfth aspect and the thirteenth aspect, the chips according to the fourteenth aspect and the fifteenth aspect, and the device capability discovery systems according to the sixteenth aspect and the seventeenth aspect, reference may be made to beneficial effects in any one of the first aspect, the second aspect, the third aspect, the fourth aspect, and the possible design manners of the first aspect, the second aspect, the third aspect, and the fourth aspect. Details are not described herein again.

DESCRIPTION OF EMBODIMENTS

A device supporting Wi-Fi P2P can discover, according to a Wi-Fi P2P technical specification, another nearby device supporting Wi-Fi P2P, and establish a Wi-Fi P2P connection to the discovered device for data transmission without a hotspot or a router. The Wi-Fi P2P technical specification may support peer-to-peer direct connection between devices, or may support simultaneous connection of a plurality of devices. In addition, the Wi-Fi P2P technical specification may be used by Wi-Fi devices that support various IEEE 802.11 standards. In addition, the Wi-Fi devices supporting the different IEEE 802.11 standards may also establish Wi-Fi P2P connections according to the Wi-Fi P2P technical specification. The IEEE 802.11 standards may include standards such as IEEE 802.11a, IEEE 802.11b, IEEE 802.11g, and IEEE 802.11n. For ease of description, a device supporting Wi-Fi P2P is referred to as a P2P device for short below.

Figure 1A:
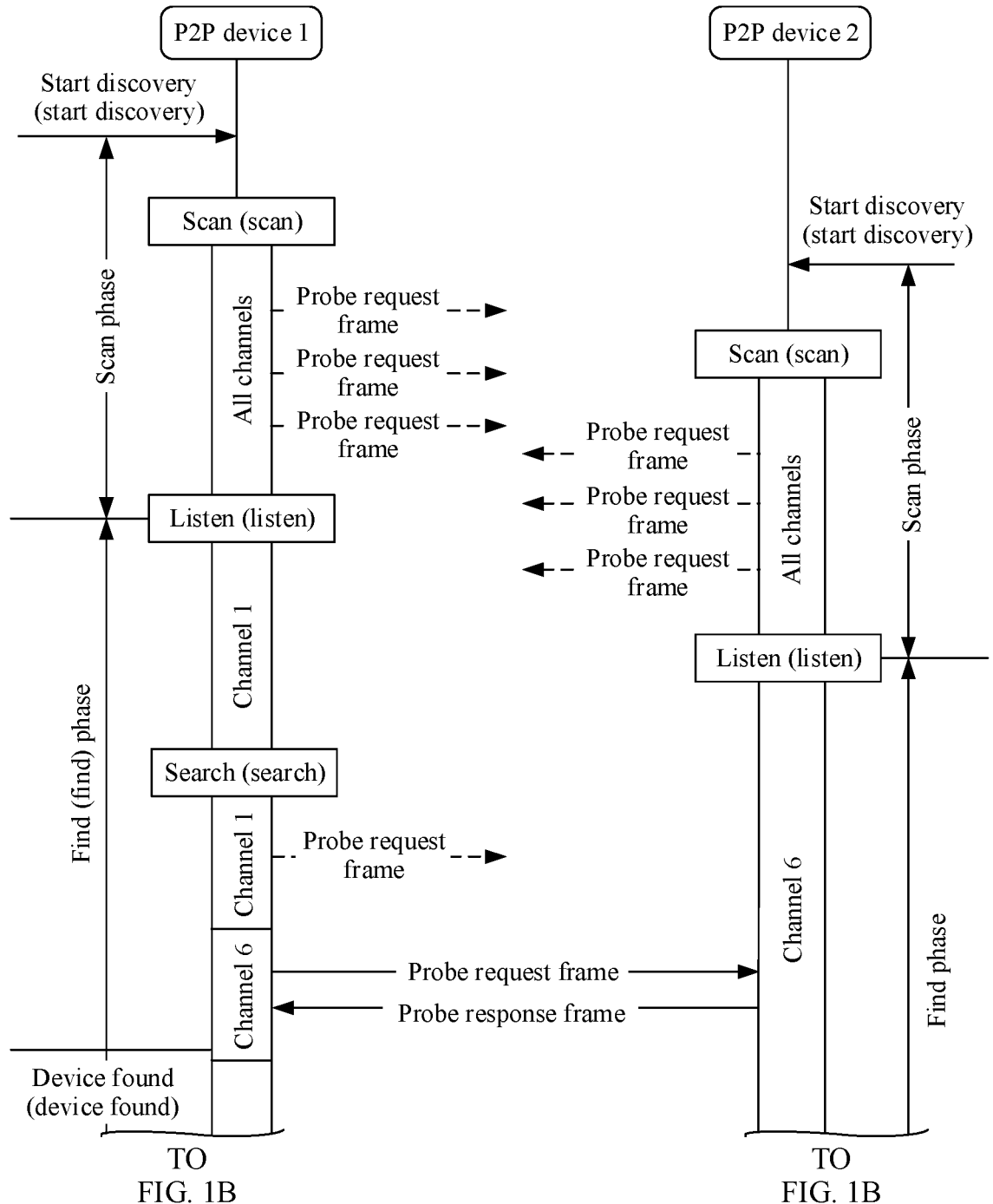
FIG. 1A and FIG. 1B are a schematic flowchart of discovering a P2P device according to the conventional technology.
Figure 1B:
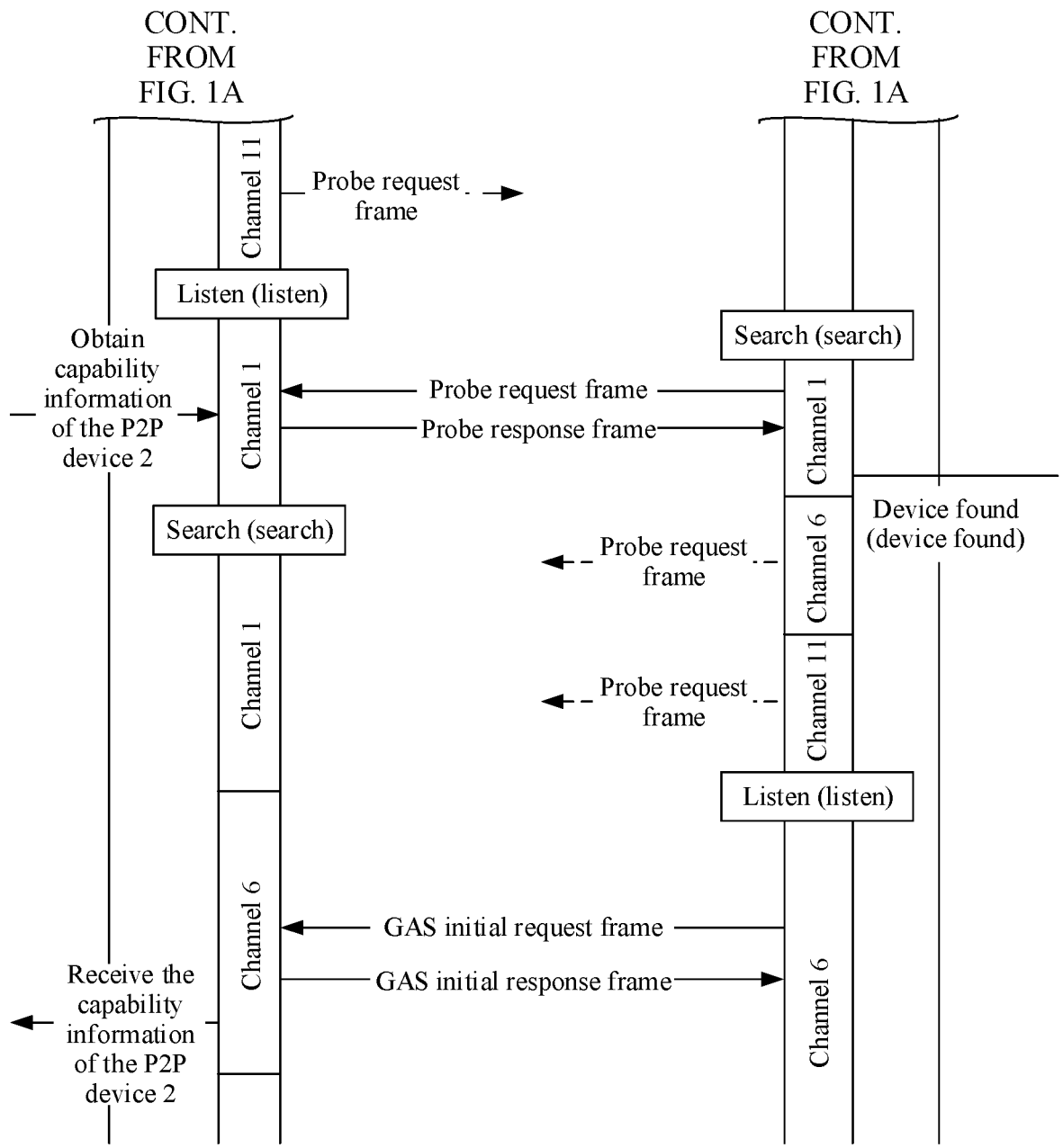

With reference to FIG. 1A and FIG. 1B, the following describes a process of mutual discovery between P2P devices by using a discovery process of the P2P device 1 and the P2P device 2 as an example.

Both the P2P device 1 and the P2P device 2 can discover each other only after a scan phase and a find phase.

In the scan phase, the P2P device (for example, the P2P device 1 or the P2P device 2) sends probe request frames on all channels available for Wi-Fi transmission to actively scan other P2P devices. In addition, the P2P device does not respond to a probe request frame from another P2P device in the scan phase. Usually, the scan phase lasts for a short period of time, for example, is. After the scan phase ends, the P2P device enters the find phase.

In the find phase, the P2P device may be in two states: a listen state and a search state, and may switch between the listen state and the search state.

In the search state, the P2P device sends a probe request frame on a search channel. The search channel is a channel defined in the IEEE 802.11 standard for P2P devices to discover each other. For example, 2.4 GHz channels 1, 6, and 11 specified in the IEEE 802.11 standard are used as search channels. In the search state, the P2P device may successively send probe request frames on the channel 1, the channel 6, and the channel 11. In the search state, the P2P device does not respond to a probe request frame from another P2P device.

In the listen state, the P2P device randomly selects a channel from the channel 1, the channel 6, and the channel 11 for listening on, to receive a probe request frame sent by another P2P device on the channel, and respond to the received probe request frame, that is, return a probe response frame to the P2P device that sends the probe request frame.

The P2P device may send one or more probe request frames on one channel. In FIG. 1A and FIG. 1B, an example in which one probe request frame is sent on one channel is used.

Figure 2A:
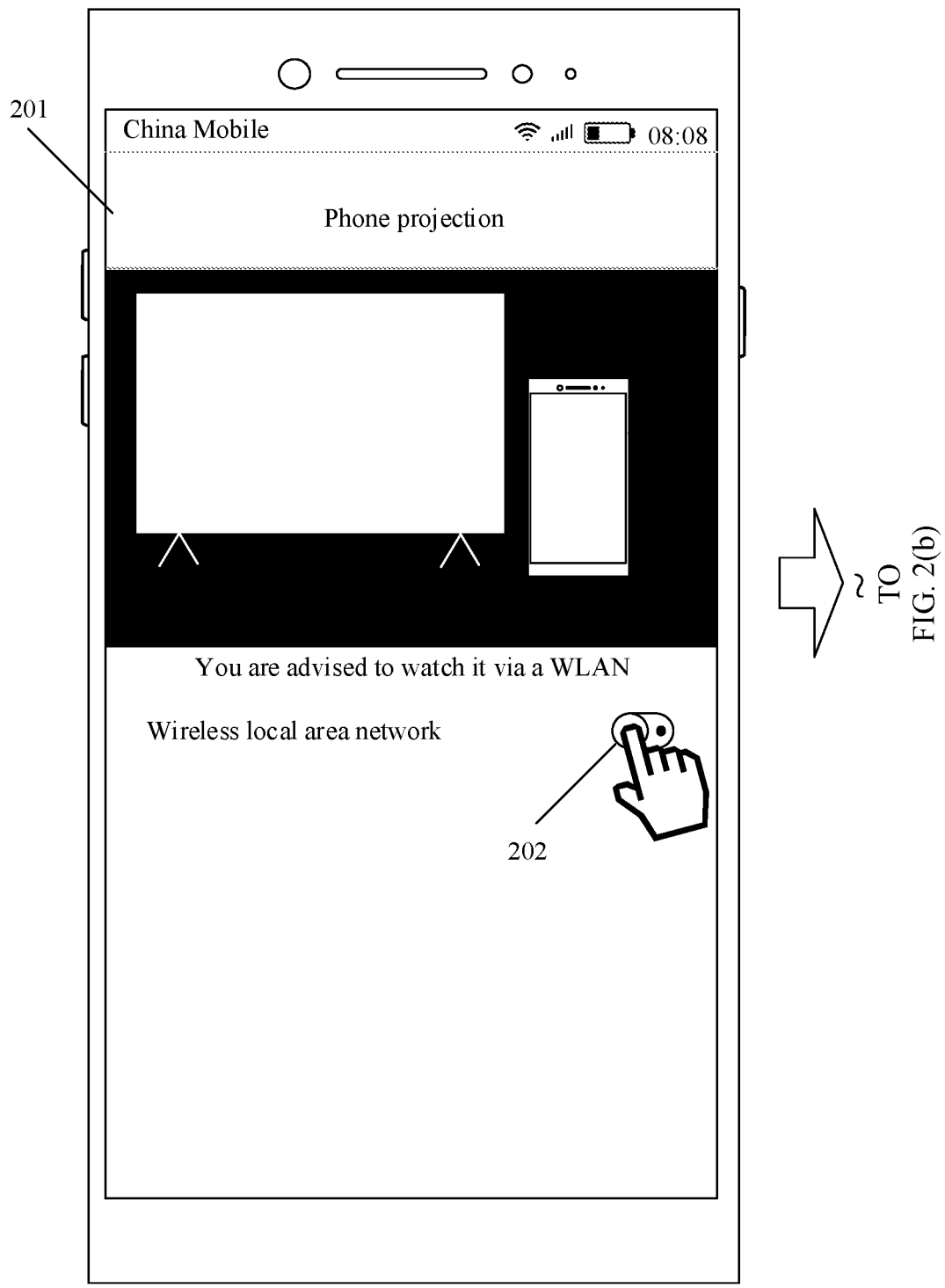
FIG. 2(a) to FIG. 2(c) are schematic diagrams of device discovery interfaces of a P2P device according to the conventional technology.
Figure 2B:
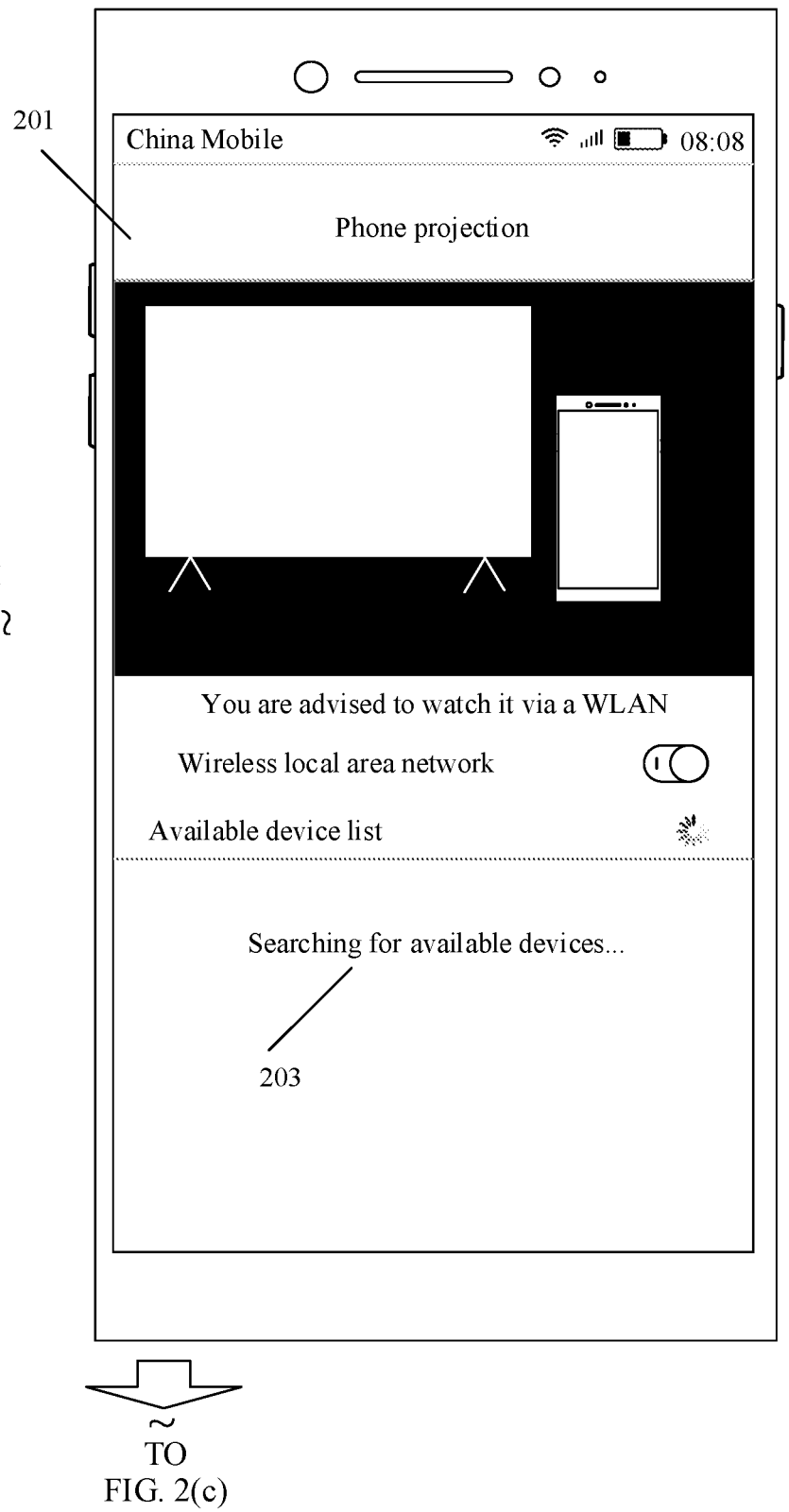

For example, the P2P device 1 is a mobile phone. When a user wants to use a projection function (data is transmitted through a Wi-Fi P2P connection established between P2P devices in the projection function) of the P2P device 1, as shown in FIG. 2(a), the user may enable a wireless projection function in a mobile phone projection setting interface 201, for example, perform a tap operation on a wireless projection button 202. After receiving the tap operation on the wireless projection button 202, the P2P device 1 may be triggered to start discovery. As shown in FIG. 1A and FIG. 1B, after the P2P device 1 is triggered to start discovery, the P2P device 1 enters the scan phase. After the scan phase ends, the P2P device 1 enters the find phase. After entering the find phase, the P2P device 1 is first in the listen state. After the listen state ends, the P2P device 1 switches to the search state. After the search state ends, the P2P device 1 switches to the listen state again. This process is repeated, to implement a device discovery process of the P2P device 1. In addition, as shown in FIG. 2(b), after the P2P device 1 is triggered to start discovery, the P2P device 1 may further display prompt information 203 in the mobile phone projection setting interface 201, to prompt the user that available devices are being searched for.

Similarly, after the P2P device 2 is triggered to start discovery, the P2P device 2 also implements a device discovery process of the P2P device 2 according to the foregoing process.

Figure 2C:
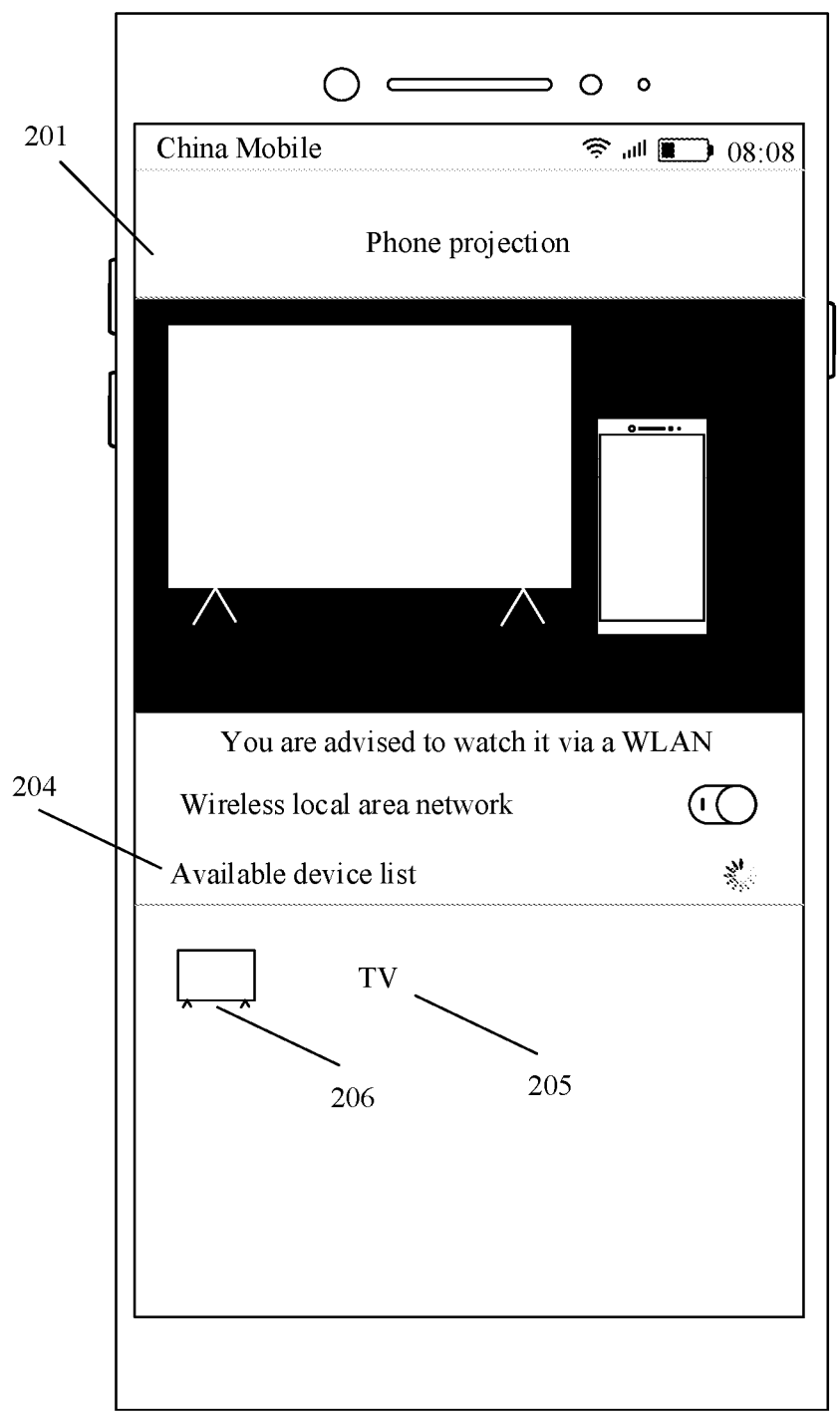

In a process in which the P2P device 1 and the P2P device 2 implement device discovery, if one P2P device is in the search state and sends a probe request frame on a channel, and the other P2P device is in the listen state and listens on the channel, the P2P device in the listen state receives the probe request frame and responds to the probe request frame. For example, as shown in FIG. 1A and FIG. 1B, the P2P device 1 is in the search state, and when the P2P device 1 sends a probe request frame on the channel 6, the P2P device 2 is in the listen state and listens on the channel 6. In this case, the P2P device 2 receives the probe request frame sent by the P2P device 1, and the P2P device 2 returns a probe response frame to the P2P device 1. When the P2P device 2 returns the probe response frame to the P2P device 1, the P2P device 2 uses the probe response frame to carry a device name and a device type of the P2P device 2. After receiving the probe response frame from the P2P device 2, the P2P device 1 may discover the P2P device 2. After the P2P device 1 discovers the P2P device 2, as shown in FIG. 2(c), the P2P device 1 may display the discovered device in an available device list 204 in the mobile phone projection setting interface 201, for example, display an identifier of the P2P device 2. The identifier may include a device name and an icon, and the icon may be used to indicate a device type. For example, the P2P device 2 is a TV. As shown in FIG. 2(c), the available device list 204 includes a name "TV" 205 of the P2P device 2 and an icon 206 of the P2P device 2.

Currently, if the P2P device 1 wants to obtain capability information of the P2P device 2, the P2P device 1 may obtain the capability information through a device service discovery process specified in the IEEE 802.11 standard.

The device service discovery process is an optional frame exchange phase, and may be performed at any time for any discovered P2P device. If the P2P device 1 wants to obtain the capability information of the P2P device 2, the P2P device 1 usually obtains the capability information through the device service discovery process after discovering the P2P device 1. The device service discovery process may be implemented through general advertisement service (GAS) frame exchange defined in the IEEE 802.11 standard. As shown in FIG. 1A and FIG. 1B, after the P2P device 1 discovers the P2P device 2, if the P2P device 1 wants to obtain the capability information of the P2P device 2, the P2P device 1 may enter the search state, and send a GAS initial request frame to the P2P device 2 on the channel 6 listened on by the P2P device 2. If the P2P device 2 is in the listen state, the P2P device 2 may receive the GAS initial request frame sent by the P2P device 1, and respond to the GAS initial request frame, that is, send a GAS initial response frame to the P2P device 1. The GAS initial response frame may carry the capability information of the P2P device 2. Capability information of a device may include all capabilities supported by the device, for example, a distributed capability, a shooting capability, a display capability, an audio play capability, and an audio capture capability. In other words, a capability supported by the device is one or more of a distributed capability, a camera, a display, a microphone, a speaker, and the like.

It can be learned that, if a P2P device wants to obtain capability information of a discovered device, the P2P device can obtain the capability information only through the device service discovery process after discovering the device. As a result, long time is consumed to discover the capability information of the device. To resolve this problem, an embodiment of the application provide a device capability discovery method. In a device discovery process, the P2P device may obtain the capability information of the discovered device, to shorten time consumed to discover the capability information of the device.

It should be noted that the P2P device in an embodiment of the application may be an electronic device that supports Wi-Fi P2P, such as a mobile phone, a TV, a tablet computer, a desktop computer, a laptop computer, a handheld computer, a notebook computer, a personal computer (PC), a netbook, a cellular phone, a personal digital assistant (PDA), a wearable device (such as a smart watch), a vehicle-mounted computer, a game console, a camera, a speaker, and an augmented reality (AR)/virtual reality (VR) device. A form of the device is not limited in the embodiments of the application.

The following describes implementations of the embodiments of the application in detail with reference to accompanying drawings.

Figure 3:
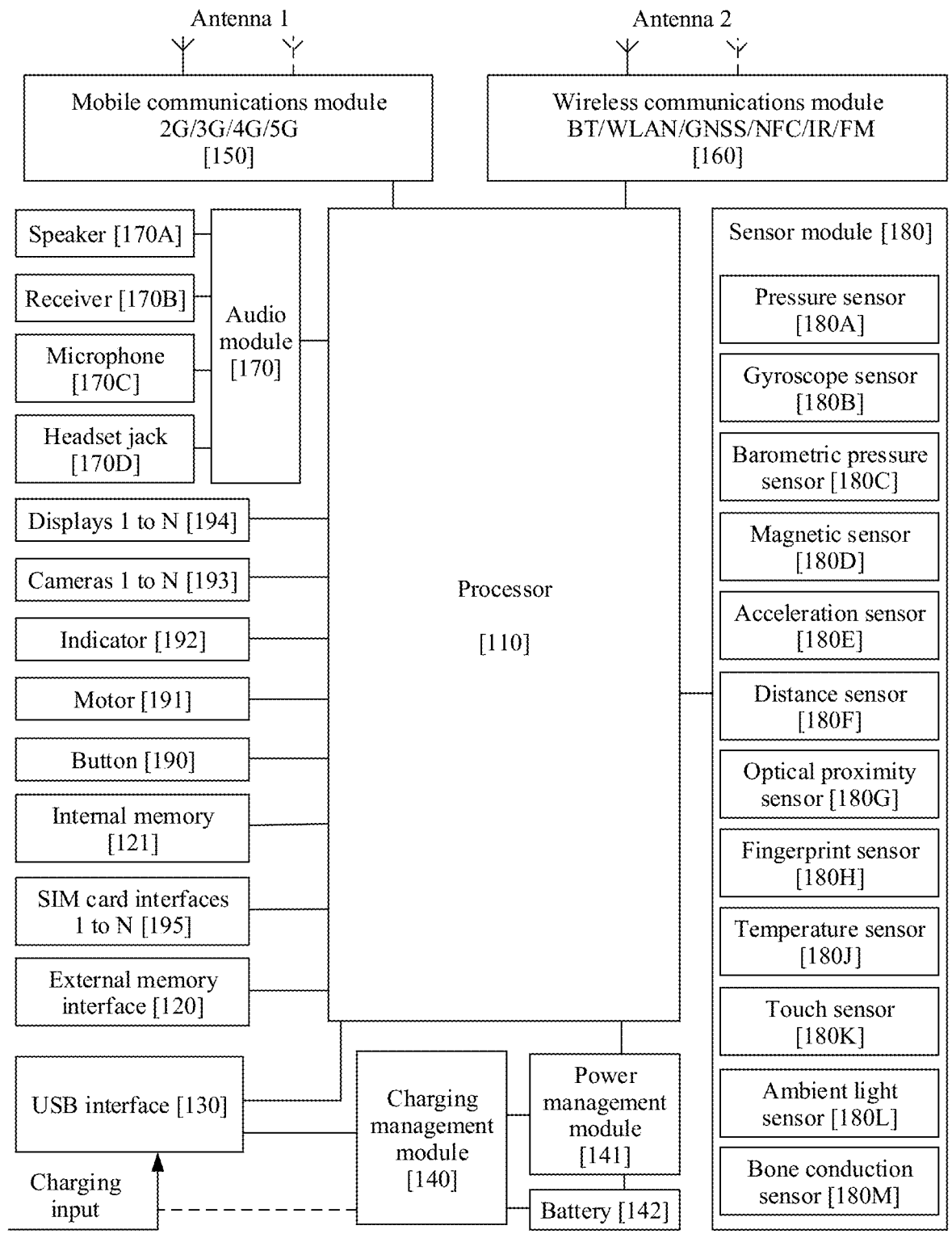
FIG. 3 is a schematic diagram of a structure of a P2P device according to an embodiment of the application.

FIG. 3 is a schematic diagram of a structure of the P2P device according to an embodiment of the application. As shown in FIG. 3, the P2P device may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in the embodiments does not constitute a limitation on the P2P device. In some other embodiments, the P2P device may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a nerve center and a command center of the P2P device. The controller may generate an operation control signal based on instruction operation code and a time sequence signal, to complete control of instruction reading and instruction execution.

A memory may be further disposed in the processor 110, and is configured to store an instruction and data. In some embodiments, the memory in the processor 110 is a cache memory. The memory may store instructions or data that has just been used or is cyclically used by the processor 110. If the processor 110 needs to use the instructions or the data again, the processor 110 may directly invoke the instructions or the data from the memory. This avoids repeated access and reduces a waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The charging management module 140 is configured to receive a charging input from a charger. The charger may be a wireless charger or a wired charger. In some embodiments in which wired charging is used, the charging management module 140 may receive a charging input from the wired charger through the USB interface 130. In some embodiments in which wireless charging is used, the charging management module 140 may receive a wireless charging input through a wireless charging coil of the P2P device. The charging management module 140 may further supply power to the P2P device by using the power management module 141 while charging the battery 142.

The power management module 141 is configured to connect to the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the P2P device may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna of the P2P device may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communications module 150 may provide a solution that is for wireless communication including 2G/3G/4G/5G and the like and that is applied to the P2P device. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transfer a processed electromagnetic wave to the modem processor for demodulation. The mobile communications module 150 may further amplify a signal modulated by the modem processor, and convert the signal to an electromagnetic wave for radiation through the antenna 1. In some embodiments, at least some functional modules of the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through the demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communications solution that is applied to the P2P device and that includes a wireless local area network (WLAN) (for example, a wireless fidelity (Wi-Fi) network), Bluetooth (BT), a global navigation satellite system (GNSS), frequency modulation (FM), a near field communication (NFC) technology, and an infrared (IR) technology. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2. For example, in the embodiments, the wireless communications module 160 may be configured to send a probe request frame, and may be further configured to receive a probe response frame from another P2P device. In some embodiments, the sent probe request frame may carry capability information of the P2P device. In some other embodiments, the received probe response frame may carry capability information of a P2P device that sends the probe response frame.

In some embodiments, the antenna 1 of the P2P device is coupled to the mobile communications module 150, and the antenna 2 is coupled to the wireless communications module 160, so that the P2P device can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), Long Term Evolution (LTE), BT, a GNSS, a WLAN, NFC, FM, an IR technology, and/or the like. The GNSS may include a global positioning system (GPS), a global navigation satellite system (GLONASS), a BeiDou satellite navigation system (BDS), a quasi-ceiling satellite system (QZSS), and/or a satellite-based augmentation system (SBAS).

The P2P device implements a display function by using the GPU, the display 194, the application processor, and the like. The GPU is a microprocessor for image processing, and connects the display 194 to the application processor. The GPU is configured to perform mathematical and geometric calculation, and perform graphics rendering. The processor 110 may include one or more GPUs that execute program instructions to generate or change display information.

The display 194 is configured to display an image, a video, and the like. The display 194 includes a display panel. For example, the display panel may be a liquid crystal display (LCD), an organic light-emitting diode (OLED), an active-matrix organic light emitting diode (AMOLED), a flex light-emitting diode (FLED), a mini-LED, a micro-LED, a micro-OLED, quantum dot light emitting diodes (QLED), or the like. In some embodiments, the P2P device may include one or N displays 194, where N is a positive integer greater than 1.

The P2P device may implement a shooting function by using the ISP, the camera 193, the video codec, the GPU, the display 194, the application processor, and the like.

The ISP is configured to process data fed back by the camera 193. For example, during shooting, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into a standard image signal in a format such as RGB or YUV. In some embodiments, the P2P device may include one or N cameras 193, where N is a positive integer greater than 1.

The digital signal processor is configured to process a digital signal, and may further process another digital signal in addition to a digital image signal. For example, when the P2P device selects a frequency, the digital signal processor is configured to perform Fourier transform on frequency energy.

The video codec is configured to compress or decompress a digital video. The P2P device may support one or more video codecs. Therefore, the P2P device may play or record videos in a plurality of coding formats, for example, moving picture experts group (MPEG)-1, MPEG-2, MPEG-3, and MPEG-4.

The NPU is a neural-network (NN) computing processor. The NPU quickly processes input information by referring to a biological neural network structure, for example, by referring to a mode of transfer between human brain neurons, and may further continuously perform self-learning. The P2P device may implement intelligent cognition such as image recognition, facial recognition, speech recognition, and text understanding through the NPU.

The external memory interface 120 may be configured to connect to an external memory card, for example, a micro SD card, to extend a storage capability of the P2P device. The external memory card communicates with the processor 110 through the external memory interface 120, to implement a data storage function, for example, to store files such as music and a video in the external memory card.

The internal memory 121 may be configured to store computer-executable program code, and the executable program code includes instructions. The processor 110 runs the instructions stored in the internal memory 121, to implement various function applications and data processing of the P2P device. For example, in an embodiment of the application, the processor 110 may run the instructions stored in the internal memory 121, so that the P2P device sends a probe request frame and receives a probe response frame. The internal memory 121 may include a program storage area and a data storage area. The program storage area may store an operating system, an application required by at least one function (for example, a sound playing function and an image playing function), and the like. The data storage area may store data (for example, audio data, a phone book, and the like) created in a process of using the P2P device, and the like. In addition, the internal memory 121 may include a high-speed random access memory, or may include a non-volatile memory, for example, at least one magnetic disk storage device, a flash memory, or a universal flash storage (UFS).

The P2P device may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The P2P device may be used to listen to music or answer a hands-free call by using the speaker 170A.

The receiver 170B, also referred to as an "earpiece", is configured to convert an audio electrical signal to a sound signal. When a call is answered or audio information is listened to by using the P2P device, the receiver 170B may be put close to a human ear to listen to a voice.

The microphone 170C, also referred to as a "mic" or a "sound conducting device", is configured to convert a sound signal into an electrical signal. When making a call, sending voice information, or needing to trigger, by using a voice assistant, the P2P device to perform some functions, a user may make a sound by putting the mouth close to the microphone 170C, and input a sound signal to the microphone 170C. At least one microphone 170C may be disposed in the P2P device. In some other embodiments, two microphones 170C may be disposed in the P2P device, to implement a noise reduction function, in addition to collecting a sound signal. In some other embodiments, three, four, or more microphones 170C may alternatively be disposed in the P2P device, to collect a sound signal, implement noise reduction, and identify a sound source, so as to implement a directional recording function and the like.

The headset jack 170D is configured to connect to a wired headset. The headset jack 170D may be the USB interface 130 or a 3.5 mm open mobile terminal platform (OMTP) standard interface or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed in the display 194. There are many types of pressure sensors 180A such as a resistive pressure sensor, an inductive pressure sensor, and a capacitive pressure sensor. The capacitive pressure sensor may include at least two parallel plates made of conductive materials. Capacitance between electrodes changes when force is applied to the pressure sensor 180A. The P2P device determines pressure intensity based on a change of the capacitance. When a touch operation is performed on the display 194, the P2P device detects a strength of the touch operation based on the pressure sensor 180A. The P2P device may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an icon of Messages, an instruction for viewing an SMS message is executed. When a touch operation whose touch operation intensity is greater than or equal to the first pressure threshold is performed on an icon of Messages, an instruction for creating an SMS message is executed.

The gyroscope sensor 180B may be configured to determine a motion posture of the P2P device. In some embodiments, an angular velocity of the P2P device around three axes (namely, axes x, y, and z) may be determined by using the gyroscope sensor 180B. The gyroscope sensor 180B may be configured to perform image stabilization during photographing. For example, when a shutter is pressed, the gyroscope sensor 180B detects an angle at which the P2P device jitters, and calculates, based on the angle, a distance for which a lens module needs to compensate, and allows the lens to eliminate the jitter of the P2P device through a reverse motion, to implement image stabilization. The gyroscope sensor 180B may be further used in a navigation scenario and a somatic game scenario.

The barometric pressure sensor 180C is configured to measure barometric pressure. In some embodiments, the P2P device calculates an altitude based on a barometric pressure value measured by the barometric pressure sensor 180C, to assist in positioning and navigation.

The magnetic sensor 180D includes a Hall sensor. The P2P device may detect opening and closing of a flip cover by using the magnetic sensor 180D. In some embodiments, when the P2P device is a clamshell phone, the P2P device may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the P2P device, and may detect magnitude and a direction of gravity when the P2P device is still. The acceleration sensor 180E may be further configured to identify a posture of the P2P device, and is used in an application such as switching between a landscape mode and a portrait mode or a pedometer.

The distance sensor 180F is configured to measure a distance. The P2P device may measure the distance in an infrared or a laser manner. In some embodiments, in a shooting scenario, the P2P device may measure a distance by using the distance sensor 180F, to implement quick focusing.

The optical proximity sensor 180G may include, for example, a light emitting diode (LED) and an optical detector, for example, a photodiode. The light-emitting diode may be an infrared light-emitting diode. The P2P device emits infrared light through the light-emitting diode. The P2P device detects infrared reflected light from a nearby object through the photodiode. When detecting sufficient reflected light, the P2P device may determine that there is an object near the P2P device. When detecting insufficient reflected light, the P2P device may determine that there is no object near the P2P device. The P2P device may detect, by using the optical proximity sensor 180G, that the user holds the P2P device close to an ear to make a call, to automatically perform screen-off for power saving. The proximity light sensor 180G may alternatively be used in a cover mode or a pocket mode to automatically perform screen unlocking or locking.

The ambient light sensor 180L is configured to sense ambient light luminance. The P2P device may adaptively adjust luminance of the display 194 based on the sensed ambient light luminance. The ambient light sensor 180L may also be configured to automatically adjust a white balance during shooting. The ambient light sensor 180L may also cooperate with the optical proximity sensor 180G to detect whether the P2P device is in a pocket, to avoid an accidental touch.

The fingerprint sensor 180H is configured to collect a fingerprint. The P2P device may use a feature of the collected fingerprint to implement fingerprint-based unlocking, application lock access, fingerprint-based shooting, fingerprint-based call answering, and the like.

The temperature sensor 180J is configured to detect a temperature. In some embodiments, the P2P device executes a temperature processing policy by using the temperature detected by the temperature sensor 180J. For example, when the temperature reported by the temperature sensor 180J exceeds a threshold, the P2P device degrades performance of a processor near the temperature sensor 180J, to reduce power consumption for thermal protection. In some other embodiments, when the temperature is lower than another threshold, the P2P device heats up the battery 142, to avoid abnormal shutdown of the P2P device caused by a low temperature. In some other embodiments, when the temperature is lower than still another threshold, the P2P device boosts an output voltage of the battery 142 to avoid abnormal shutdown caused by a low temperature.

The touch sensor 180K is alternatively referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation acting on or near the touch sensor 180K. The touch sensor may transfer the detected touch operation to the application processor, to determine a type of a touch event. The display 194 provides a visual output related to the touch operation. In some other embodiments, the touch sensor 180K may also be disposed on a surface of the P2P device in a position different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also contact a body pulse to receive a blood pressure beating signal. In some embodiments, the bone conduction sensor 180M may also be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The P2P device may receive a key input, and generate a key signal input related to a user setting and function control of the P2P device.

The motor 191 may generate a vibration prompt. The motor 191 may be used for an incoming call vibration prompt, or may be used for a touch vibration feedback. For example, touch operations performed on different applications (for example, shooting and audio playing) may correspond to different vibration feedback effects. The motor 191 may also correspond to different vibration feedback effects for touch operations performed on different areas of the display 194. Different application scenarios (for example, a time reminder scenario, an information receiving scenario, an alarm clock scenario, and a game scenario) may also correspond to different vibration feedback effects. A touch vibration feedback effect may alternatively be customized.

The indicator 192 may be an indicator light, and may be configured to indicate a charging status and a power change, or may be configured to indicate a message, a missed call, a notification, and the like.

The SIM card interface 195 is configured to be connected to a SIM card. The SIM card may be inserted into the SIM card interface 195 or removed from the SIM card interface 195, to come into contact with or be separated from the P2P device. The P2P device may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type, or may be of different types. The SIM card interface 195 may be further compatible with different types of SIM cards. The SIM card interface 195 may also be compatible with an external memory card. The P2P device interacts with a network by using the SIM card, to implement functions such as calling and data communication. In some embodiments, the P2P device uses an eSIM, namely, an embedded SIM card. The eSIM card can be embedded in the P2P device and cannot be separated from the P2P device.

All methods in the following embodiments may be implemented on the P2P device having the foregoing hardware structure.

Usually, data transmission for a projection function, a Wi-Fi direct connection function, and an instant sharing function (for example, a Huawei share function of a Huawei mobile phone) of the P2P device can be implemented by establishing a Wi-Fi P2P connection to another P2P device. When a user wants to use these functions, the user may perform a corresponding operation in a corresponding interface, for example, perform an operation on a corresponding button, to trigger the P2P device to discover another nearby P2P device, and establish a Wi-Fi P2P connection to the discovered device for data transmission.

In an embodiment of the application, in a device discovery process, the P2P device may obtain capability information of the discovered device, so that the user can select, based on the obtained capability information of the device, an appropriate device for cooperating with the P2P device to implement a corresponding function. For example, in a discovery procedure of a P2P device 1 (for example, the P2P device 1 may be a first P2P device in the application) and a P2P device 2 (for example, the P2P device 2 may be a second P2P device in the application), the P2P device 1 obtains capability information of the P2P device 2. In some embodiments, when responding to a probe request frame from the P2P device 1, that is, when sending a probe response frame to the P2P device 1, the P2P device 2 may transmit the probe response frame including the capability information of the P2P device 2 to the P2P device 1, so that the P2P device 1 obtains the capability information of the P2P device 2. In some other embodiments, the P2P device 2 may send a probe request frame including the capability information of the P2P device 2. In this way, when receiving the probe request frame from the P2P device 2, the P2P device 1 can obtain the capability information of the P2P device 2.

The following describes, based on different implementations of obtaining capability information of a P2P device, a device capability discovery method provided in the embodiments of the application by using an example in which the user wants to use a projection function of the P2P device 1.

Embodiment 1: A P2P device transmits a probe response frame including capability information of the P2P device to another P2P device.

Figure 4:
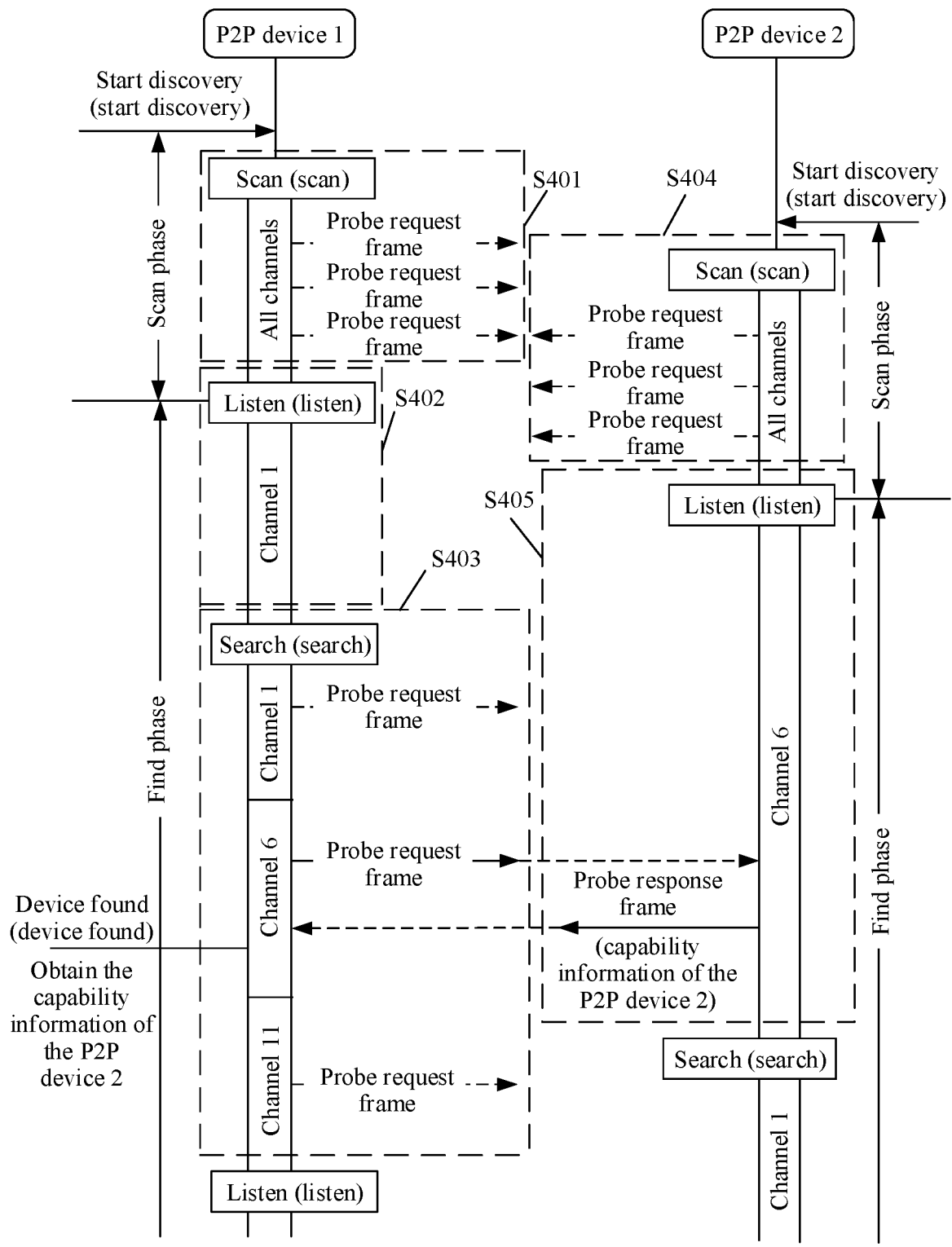
FIG. 4 is a schematic flowchart of a device capability discovery method according to an embodiment of the application.

FIG. 4 is a schematic flowchart of a device capability discovery method according to an embodiment of the application. As shown in FIG. 4, the method may include the following operations.

S401: After a P2P device 1 is triggered to start discovery, the P2P device 1 enters a scan phase. In the scan phase, the P2P device 1 sends probe request frames on all channels available for Wi-Fi transmission.

Figure 7A:
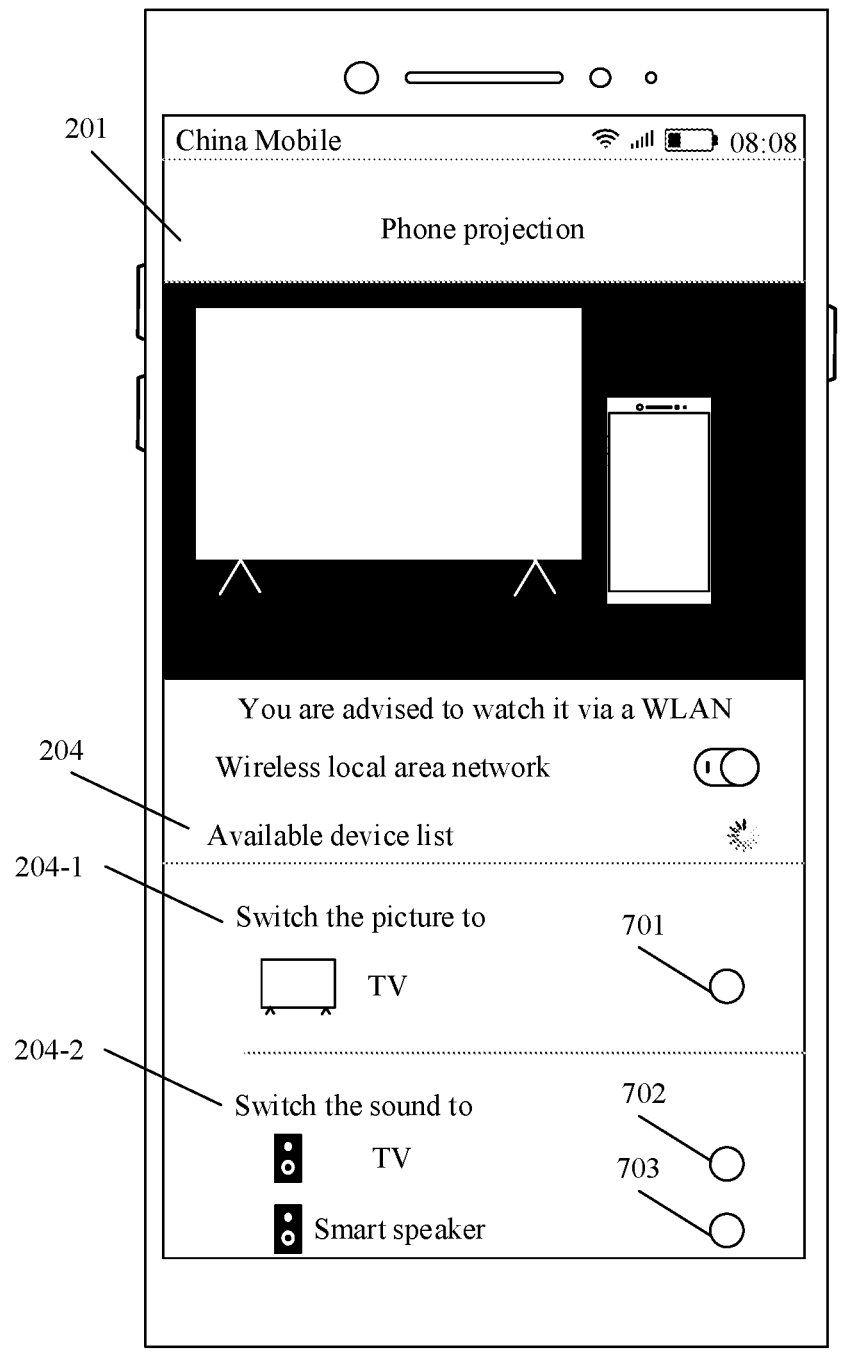
FIG. 7A is a schematic diagram of another device discovery interface of a P2P device according to an embodiment of the application.
Figure 7B:
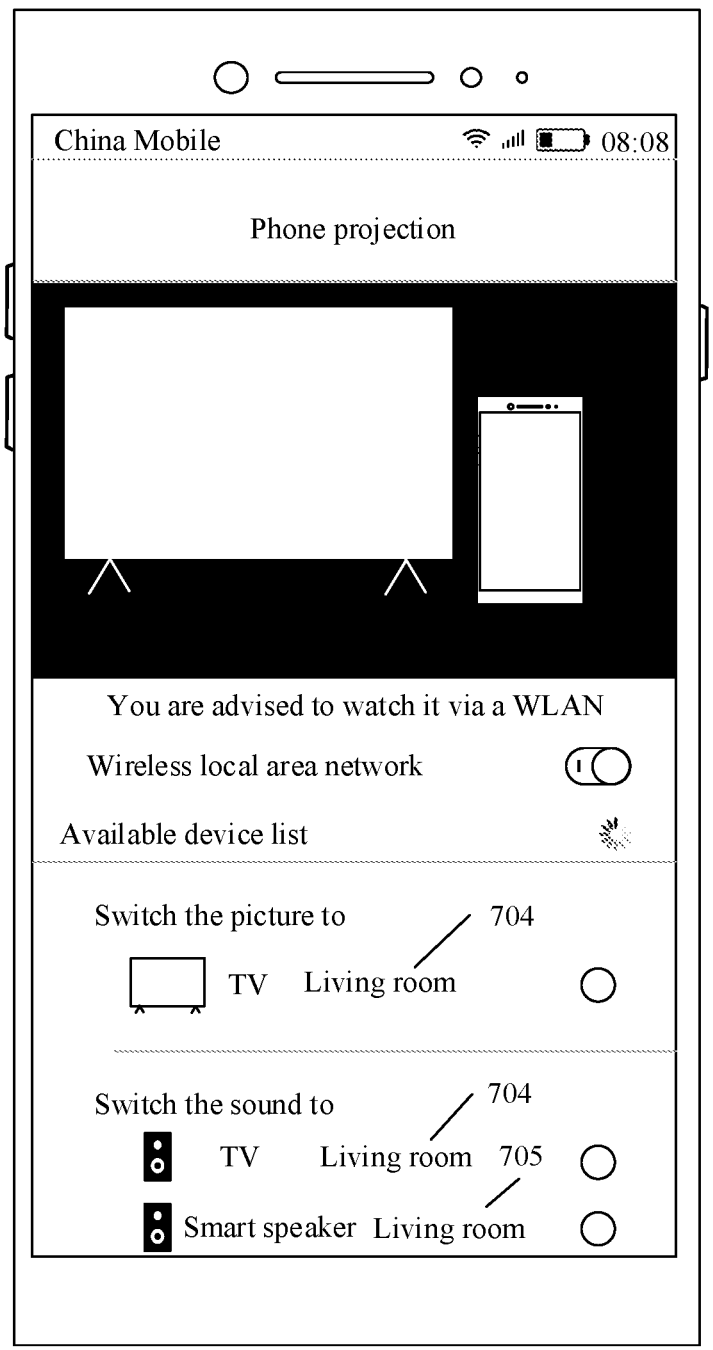
FIG. 7B is a schematic diagram of another device discovery interface of a P2P device according to an embodiment of the application.
Figures 1, 7C:
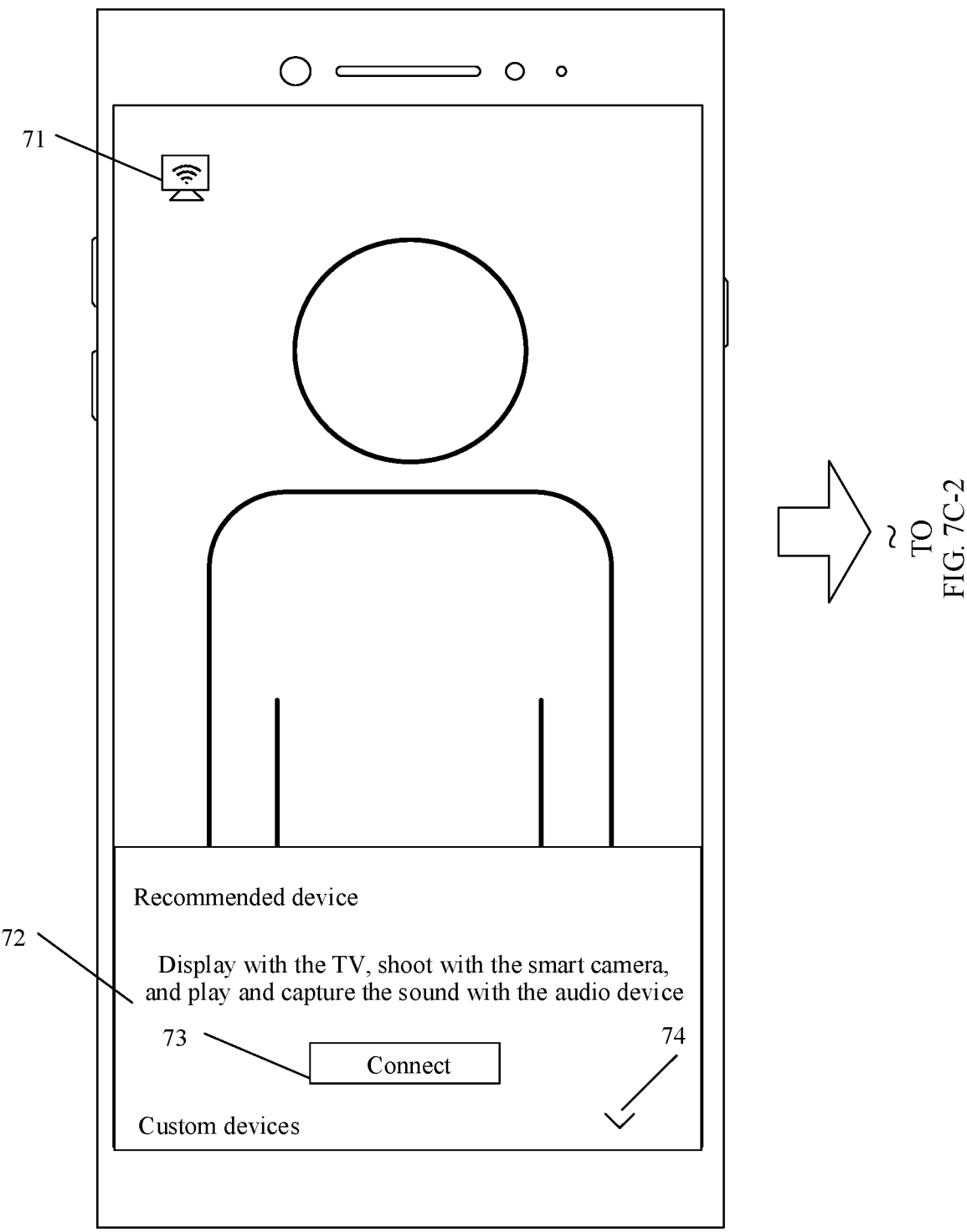
FIG. 7C-1 and FIG. 7C-2 are schematic diagrams of another device discovery interfaces of a P2P device according to an embodiment of the application.
Figures 2, 7C:
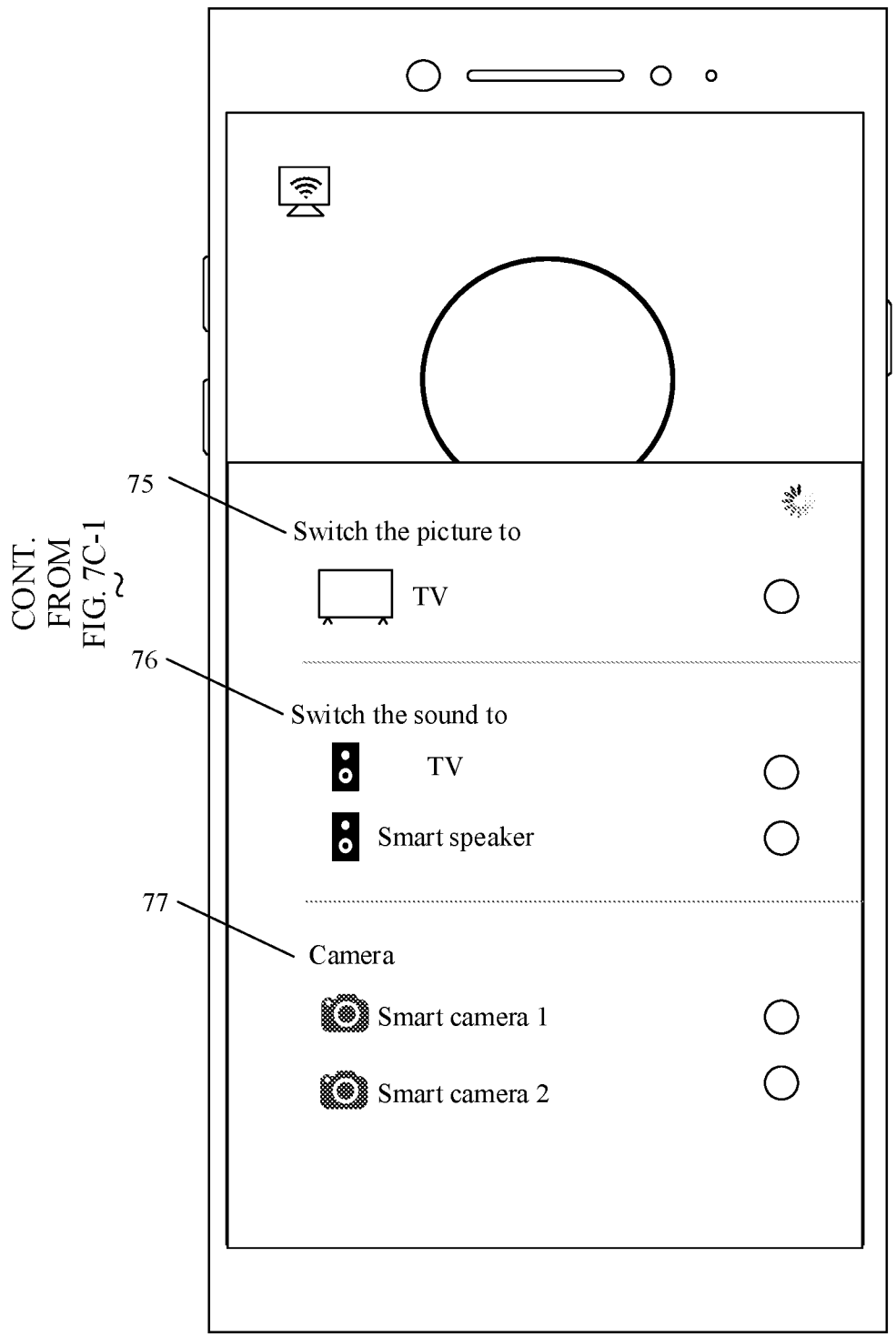

For example, with reference to FIG. 2(*a*), the P2P device 1 is a mobile phone. When a user wants to use a projection function of the P2P device 1, the user performs a tap operation on the wireless projection button 202 in the mobile phone projection setting interface 201. After receiving the tap operation, the P2P device 1 may be triggered to start discovery. After the P2P device 1 is triggered to start discovery, as shown in FIG. 2(*b*), the P2P device 1 may further display the prompt information 203 in the mobile phone projection setting interface 201, to prompt the user that the P2P device 1 is searching for available devices.

After the P2P device 1 is triggered to start discovery, the P2P device 1 enters the scan phase. In the scan phase, the P2P device 1 sends probe request frames on all the channels available for Wi-Fi transmission, for example, 2.4 GHz channels 1, 2, 3, 4, 6, and 11.

S402: The P2P device 1 enters a listen state, and listens on the channel 1.

After the scan phase ends, the P2P device 1 enters a find phase. After entering the find phase, the P2P device 1 is first in the listen state. That is, the P2P device 1 randomly selects a channel from the channel 1, the channel 6, and the channel 11 for listening on. For example, the P2P device 1 selects the channel 1 for listening on. In a process of listening on the channel 1, if the P2P device 1 receives a probe request frame sent by another P2P device, the P2P device 1 responds to the probe request frame. In the example in FIG. 4, the P2P device 1 does not detect, on the channel 1, a probe request frame sent by another P2P device.

S403: The P2P device 1 enters a search state, and sends probe request frames on the channel 1, the channel 6, and the channel 11.

After the listen state ends, the P2P device 1 switches to the search state. That is, the P2P device 1 sends a probe request frame on a search channel. For example, 2.4 GHz channels 1, 6, and 11 specified in the IEEE 802.11 standard are used as search channels. The P2P device 1 may successively send the probe request frames on the channel 1, the channel 6, and the channel 11.

Certainly, after the search state ends, the P2P device 1 switches to the listen state again. This process is repeated, to implement a device discovery process of the P2P device 1.

S404: After a P2P device 2 is triggered to start discovery, the P2P device 2 enters a scan phase. In the scan phase, the P2P device 2 sends probe request frames on all channels available for Wi-Fi transmission.

Figure 5A:
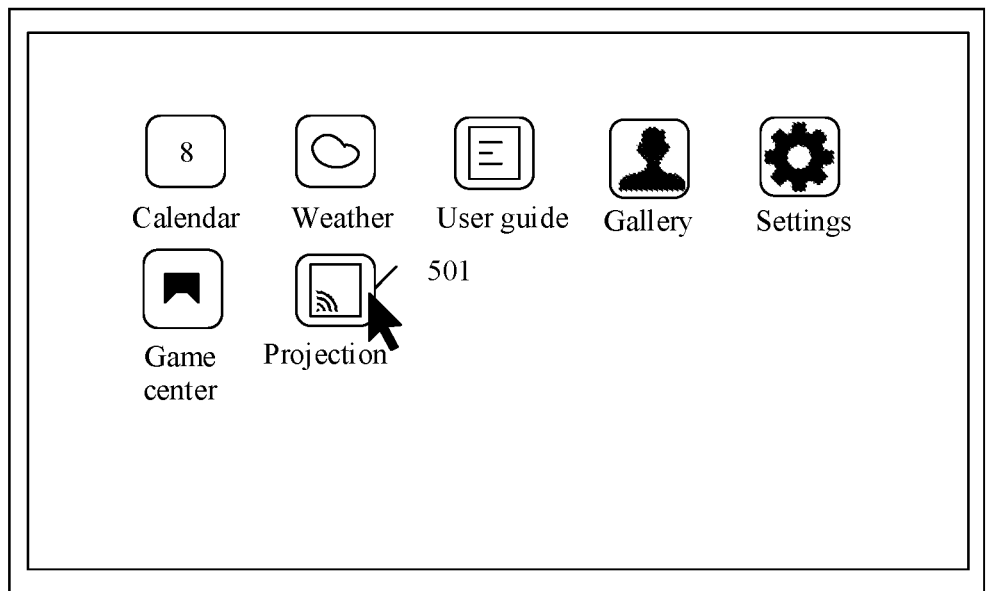
FIG. 5(a) and FIG. 5(b) are schematic diagrams of device discovery interfaces of a P2P device according to an embodiment of the application.
Figure 5B:
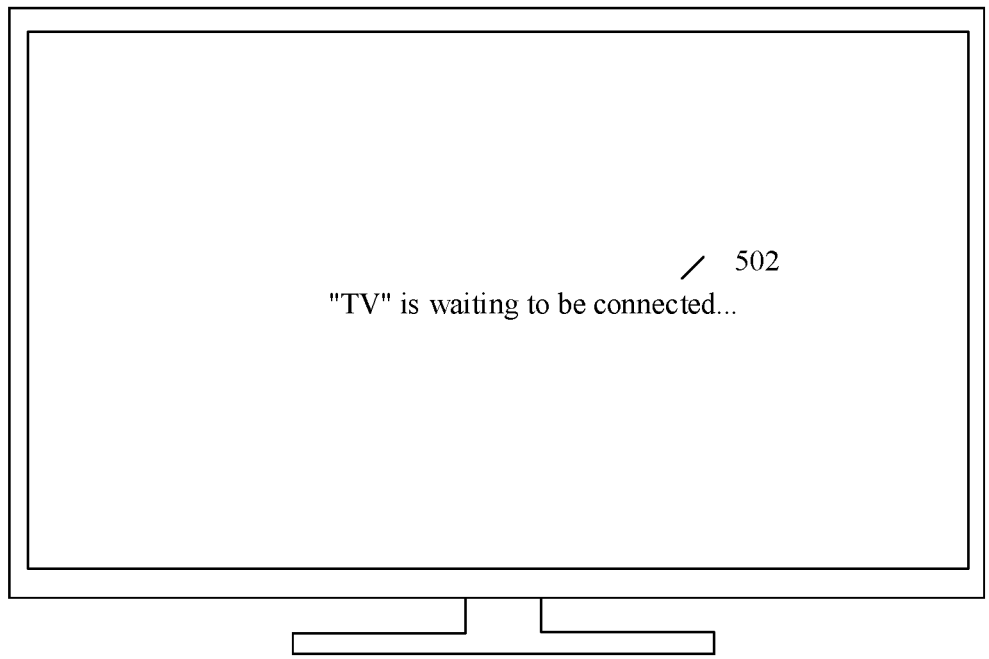

For example, with reference to FIG. 5(*a*) and FIG. 5(*b*), the P2P device 2 is a TV. When the user wants to use the P2P device 2 to cooperate with the P2P device 1 to implement the projection function, as shown in FIG. 5(*a*), the user may open a projection application 501 on the P2P device 2. After receiving an operation performed by the user on the projection application 501, the P2P device 2 may be triggered to start discovery. After the P2P device 2 is triggered to start discovery, as shown in FIG. 5(*b*), the P2P device 2 may further display prompt information 502 that is used to prompt the user to wait for another device to connect. In addition, in an embodiment, after the P2P device 2 is triggered to start discovery, the P2P device 2 also enters the scan phase, and sends probe request frames on all the channels available for Wi-Fi transmission.

S405: The P2P device 2 enters a listen state, and listens on the channel 6.

Similar to the P2P device 1, after the scan phase ends, the P2P device 2 also enters a find phase, and is first in the listen state. That is, the P2P device 2 randomly selects a channel from the channel 1, the channel 6, and the channel 11 for listening on. For example, the P2P device 2 selects the channel 6 for listening on. In a process of listening on the channel 6, if the P2P device 2 receives a probe request frame sent by another P2P device, the P2P device 2 responds to the probe request frame. In the example in FIG. 4, when listening on the channel 6, the P2P device 2 receives a probe request frame sent by the P2P device 1. The P2P device 2 responds to the probe request frame. That is, the P2P device 2 returns a probe response frame to the P2P device 1.

In an embodiment, the probe response frame may carry a device name and a device type of the P2P device 2. In addition, the probe response frame further carries capability information of the P2P device 2. The capability information may include all capabilities supported by the P2P device 2, such as a distributed capability, a shooting capability, a display capability, an audio play capability, and an audio capture capability. In other words, the capability information may include all capabilities supported by the P2P device 2, such as a distributed capability, a camera, a display, a microphone, and a speaker. The distributed capability means that the device has a capability of collecting capabilities supported by different nearby devices, and enables each device to run a capability of the device. For example, the P2P device 2 having the distributed capability means that the P2P device 2 can learn of which nearby device supports the camera, which nearby device supports the screen displaying, which nearby device supports the broadcaster, and the like, and the P2P device 2 may provide a portal (for example, an interface) for selecting by the user to trigger a corresponding device to run a corresponding capability. An existing field of the probe response frame or a new field extended in a reserved field of the probe response frame may carry the capability information of the device.

Figure 6:
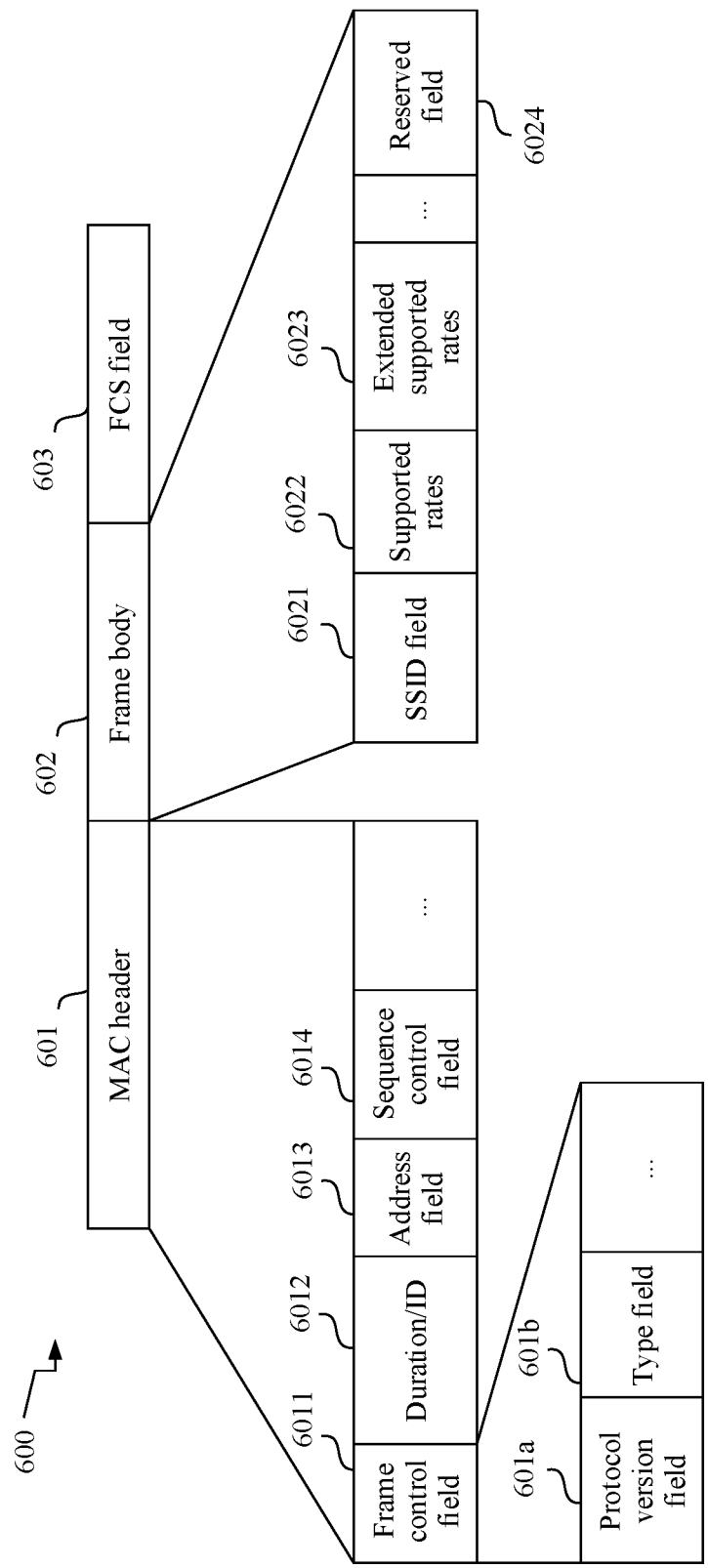
FIG. 6 is a schematic diagram of an example of a frame structure of a Wi-Fi frame according to an embodiment of the application.

For example, FIG. 6 is a schematic diagram of an example of a frame structure of a Wi-Fi frame according to an embodiment of the application. As shown in FIG. 6, the Wi-Fi frame 600 may include a frame header (that is, a MAC header) 601, a frame body 602, and a frame check sequence (FCS) field 603. The MAC header 601 is a media access control (MAC) header.

As shown in FIG. 6, the MAC header 601 may include a frame control field 6011, a duration/ID field 6012, an address field 6013, a sequence control field 6014, and the like.

The frame control field 6011 may include a protocol version field 601*a*, a type field 601*b*, and the like. The protocol version field 601*a* is used to indicate a protocol version to which the Wi-Fi frame 600 conforms, and the protocol version is usually 0. The type field 601*b* may include a type and a subtype. The type is used to indicate that a corresponding frame is a management frame, a data frame, or a control frame, and the subtype is used to indicate a subtype of a frame. For example, when type=00, it may indicate that a corresponding frame is the management frame. In this case, the subtype may indicate which management frame such as a Beacon frame, a probe request frame, or a probe response frame the management frame is. For example, when type=00 and subtype=0100, the Wi-Fi frame 600 shown in FIG. 6 is a probe request frame. When type=00 and subtype=0101, the Wi-Fi frame 600 shown in FIG. 6 is a probe response frame. The address field 6013 may include address information such as a source address, a destination address, an address of a transmission workstation, and an address of a receiving workstation. The destination address may be any one of a unicast address, a multicast address, and a broadcast address.

As shown in FIG. 6, the frame body 602 includes an SSID field 6021, a supported rates field 6022, an extended supported rates field 6023, and a reserved field 6024. The supported rates field 6022 and the extended supported rates field 6023 are used to indicate a set of rates supported by the P2P device or a wireless router.

In an embodiment, when the Wi-Fi frame 600 shown in FIG. 6 is a probe response frame, that is, when the type and the subtype in the type field 601b indicate that the Wi-Fi frame 600 is a probe response frame, the frame body 602 may carry capability information of a device that sends the probe response frame. For example, the reserved field 6024 of the frame body 602 or a reserved bit of an existing field of the frame body 602 may be used to carry the capability information of the device.

Specific composition and corresponding descriptions of the device capability information carried in the probe response frame are shown in Table 1.

TABLE 1

| Field | Length (byte) | Content | Description |
|---|---|---|---|
| TLV (type) | 1 | 0x42 (Capability) | Attribute type |
| TLV (length) | 1 | 0x02 | Length of the value |
| TLV (value) | 2 | | Capabilities supported by the device: First bit: indicating whether the distributed capability is supported Second bit: indicating whether the camera is supported (or whether the shooting capability is supported) Third bit: indicating whether the screen displaying is supported (or whether the display capability is supported) Fourth bit: indicating whether the microphone is supported (or whether the audio capture capability is supported) Fifth bit: indicating whether the speaker is supported (or whether the audio play capability is supported) Following bits are reserved for extension |

As shown in Table 1, a field that is in the probe response frame and that is used to indicate the capability information of the device includes three parts: a type, a length, and a value. Content of the type may be 0x42, and is used to indicate an attribute type of the field, that is, used to indicate that the field indicates capabilities of a device. The type may be 1 byte in length. Certainly, the type may also be other content, and content may be predefined or may be negotiated between P2P devices. Content of the length may be 0x02, and is used to indicate a length of the value. The content of the length is determined based on the length of the value, is not limited to 0x02, and may be other content. Content of the value depends on capabilities supported by the device. For example, the first bit is used to indicate whether the device supports the distributed capability, the second bit is used to indicate whether the device supports the camera, the third bit is used to indicate whether the device supports the screen displaying, the fourth bit is used to indicate whether the device supports the microphone, the fifth bit is used to indicate whether the device supports the speaker, and other positions may be reserved as extension bits. Certainly, a capability supported by the device indicated by each bit may also be different from that in the foregoing example. A bit that indicates a capability supported by the device may be predefined, or may be negotiated between P2P devices. This is not limited in an embodiment.

In this way, after receiving the probe response frame from the P2P device 2, the P2P device 1 may learn of, based on the capability information of the P2P device 2 carried in the probe response frame, capabilities of the P2P device 2. For example, the P2P device 2 (for example, the TV) supports the screen displaying and the speaker, and a field used to indicate the capability information of the device in the probe response frame is 0x420x020014. After receiving the probe response frame including 0x420x020014 from the P2P device 2, the P2P device 1 may learn that the P2P device 2 (for example, the TV) supports the screen displaying and the speaker.

In addition, with reference to FIG. 2, in an embodiment, after the P2P device 1 discovers the P2P device 2, the P2P device 1 may display the discovered device in the available device list 204 of the mobile phone projection setting interface 201. For example, when the discovered P2P device 2 is displayed in the available device list 204, the discovered device may be displayed based on the capability information of the P2P device 2 and the functions supported by the P2P device 2. For example, the available device list 204 may be divided into a plurality of sub-items, and each sub-item includes identifiers of devices that support a same capability. An identifier may include at least one of the following: a name of a device, an icon corresponding to a capability, an icon used to indicate a type of the device, and a location of the device (in the user's home, the device may be located in a living room, a main bedroom, a second bedroom, a kitchen, or the like). In some embodiments, the location of the device may be reported by the device to the P2P device 1 as a capability of the P2P device 2, or may be obtained by the P2P device 1 based on a historical location of the P2P device 2.

For example, with reference to the foregoing example, the P2P device 2 is a TV and supports the screen displaying and the speaker, and identifiers include a name of the device and an icon of a corresponding capability of the device. As shown in FIG. 7A, for example, the available device list 204 in the mobile phone projection setting interface 201 is divided into two sub-items: a "Switch the picture to" sub-item 204-1 and a "Switch the sound to" sub-item 204-2. The P2P device 1 may display identifiers of the P2P device 2 (the name "TV" of the P2P device 2 and an icon (a TV icon) of a corresponding capability) in the "Switch the picture to" sub-item 204-1, to indicate that only a video picture can be projected to the P2P device 2 for playing during projection. The P2P device 1 may further display identifiers of the P2P device 2 (the name "TV" of the P2P device 2 and an icon (a speaker icon) of a corresponding capability) in the "Switch the sound to" sub-item 204-2, to indicate that only sound can be projected to the P2P device 2 for playing during projection.

Similar to the processes of S404 and S405, the P2P device 1 may also discover other P2P devices, and obtain capability information of the other P2P devices based on probe response frames returned by these devices. In addition, identifiers of these devices may also be displayed in the sub-items of the available device list 204 shown in FIG. 7A based on the capability information of these devices. For example, as shown in FIG. 7A, the P2P device 1 further discovers a P2P device 3. The P2P device 3 is a speaker and supports only the speaker. In this case, the P2P device 1 may display identifiers of the P2P device 3 (a name "smart speaker" of the P2P device 3 and an icon (a speaker icon) of a corresponding capability) in the "Switch the sound to" sub-item 204-2. In some embodiments, identifiers of devices included in the sub-item may be sorted based on a time sequence of discovering the devices, or may be sorted based on capabilities of the discovered devices. For example, the "Switch the picture to" sub-item 204-1 includes identifiers of a plurality of devices, and based on screen resolutions of the devices, the identifiers of the devices are sorted in descending order of the screen resolutions of the corresponding devices in the "Switch the picture to" sub-item 204-1.

Certainly, the sub-items shown in FIG. 7A are merely examples, and the available device list 204 may further include other sub-items, and these sub-items include identifiers of devices supporting other capabilities. For example, a "Camera" list may be further included. Devices included in this sub-item may be used to cooperate with the P2P device 1 to implement the shooting function.

In addition, in the mobile phone projection setting interface 201, the P2P device 1 may further display a selection button corresponding to an identifier of a discovered device in each sub-item. For example, as shown in FIG. 7A, the "Switch the picture to" sub-item 204-1 includes a selection button 701 corresponding to an identifier of the P2P device 2 (namely, the TV). The "Switch the sound to" sub-item 204-2 includes a selection button 702 corresponding to an identifier of the P2P device 2 (namely, the TV), and a selection button 703 corresponding to an identifier of the P2P device 3 (namely, the speaker). For example, with reference to FIG. 8, a user is using the P2P device 1 to watch the video "The Wandering Earth". If the user wants to switch a picture of a video played on the P2P device 1 to the P2P device 2 (namely, a TV 801), and switch sound to the P2P device 3 (namely, a speaker 802). The user may perform a tap operation on the selection button 701 shown in FIG. 7A. In response to the tap operation, the P2P device 1 establishes a Wi-Fi P2P connection to the P2P device 2 (namely, the TV 801), and projects the picture of the video being played on the P2P device 1 to the P2P device 2 (namely, the TV 801) for playing. The user may further perform a tap operation on the selection button 703 shown in FIG. 7A. In response to the tap operation, the P2P device 1 establishes a Wi-Fi P2P connection to the P2P device 3 (namely, the speaker 802), and projects the sound of the video being played on the P2P device 1 to the P2P device 3 (namely, the speaker 802) for playing.

Figure 8:
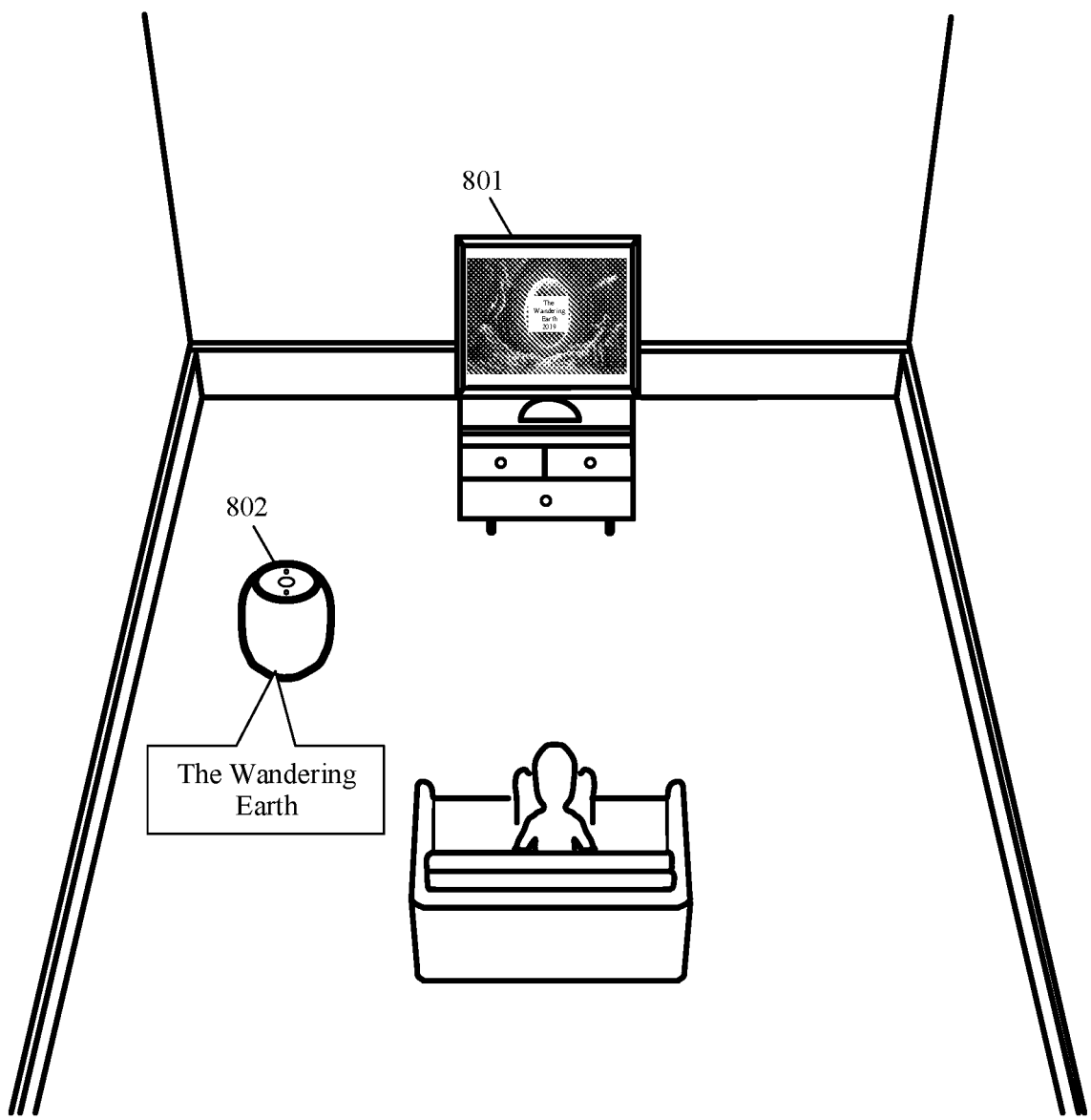
FIG. 8 is a schematic diagram of a scenario according to an embodiment of the application.

In some other embodiments, an example in which the identifiers include a name of a device, an icon corresponding to a capability, and a location of the device is used. FIG. 7A may be replaced with FIG. 7B. It can be seen that, as shown in FIG. 7B, the P2P device 1 may not only display, based on capability information of discovered devices, names of discovered devices and icons of corresponding capabilities in corresponding sub-items of an available device list, but also display location of the devices. With reference to FIG. 8, as shown in FIG. 7B, the P2P device 2 (namely, the TV 801) is located in a living room, and "Living room" 704 is correspondingly displayed. The P2P device 3 (namely, the speaker 802) is also located in the living room, and "Living room" 705 is correspondingly displayed. It should be noted that the identifiers of the devices included in the sub-items of the available device list may be vertically arranged as shown in FIG. 7A or FIG. 7B, or horizontally arranged. A display style of the identifiers of the devices included in the sub-items is not limited in an embodiment.

For another example, with reference to FIG. 7C, when using the P2P device 1 (for example, a mobile phone) for a video chat, the user wants to implement a projection function. As shown in FIG. 7C-1, the user may perform a tap operation on a projection button 71 in a video interface displayed by the P2P device 1. In response to the tap operation, the P2P device 1 is triggered to start discovery. In addition, the user also triggers other P2P devices to start discovery. In this way, after the P2P device performs the process of S401 to S405 in an embodiment, the P2P device 1 may discover the other P2P devices, and may obtain capability information of the other P2P devices. Then, the P2P device 1 may display recommendation information 72 based on capabilities of the discovered devices. For example, the recommendation information includes prompt information of a device recommended to the user. For example, the prompt information is: Display with the TV, shoot with the smart camera, and play and capture the sound with the audio device. If the user wants to use the recommended scheme, the user may perform a tap operation on a "Connect" button 73. The P2P device 1 may establish a Wi-Fi P2P connection to each recommended device based on the tap operation performed by the user on the "Connect" button 73, and transmit data to the corresponding device on the Wi-Fi P2P connection. For example, the P2P device 1 establishes a Wi-Fi P2P connection to the TV, and transmits a picture to the TV for display. The P2P device 1 establishes a Wi-Fi P2P connection to the smart camera, and the smart camera captures images and transmits the images to the P2P device 1. The P2P device 1 establishes a Wi-Fi P2P connection to the audio device, and the audio device plays and captures sound. Data transmission is based on the established Wi-Fi P2P connection. If the user does not want to use the recommended device, but wants to select devices for projection, the user may perform a tap operation on a button 74 corresponding to a "Custom devices" option. In response to the tap operation of the user on the button 74, as shown in FIG. 7C-2, the P2P device 1 may display an available device list. The available device list is similar to the available device list shown in FIG. 7A or FIG. 7B. For example, the available device list is divided into three sub-items: a "Switch the picture to" sub-item 75, a "Switch the sound to" sub-item 76, and a "Camera" sub-item 77. Devices corresponding to identifiers included in the "Switch the picture to" sub-item 75 have a same capability, namely, the display capability. Devices corresponding to identifiers included in the "Switch the sound to" sub-item 76 have a same capability, namely, the audio play capability and/or the audio capture capability. Devices corresponding to identifiers included in the "Camera" sub-item 77 have a same capability, namely, the shooting capability. The user may perform an operation on a selection button corresponding to an identifier in each sub-item, to project a corresponding function to a corresponding device for implementation.

According to the technical solution, the P2P device sends the probe response frame including the capability information of the P2P device to the another P2P device, so that the device can obtain the capability information of the discovered device in a device discovery phase. Less time is consumed to discover capability information of a device compared with time consumed to obtain the capability information of the device through a device service discovery process after the device is discovered. In addition, after the capability information of the device is obtained, the identifier of the discovered device may be displayed in a corresponding sub-item based on the capability information of the device. A same sub-item includes identifiers of devices that support a same capability, and devices corresponding to identifiers included in different sub-items support different capabilities. In addition, when a device supports a plurality of capabilities, a sub-item corresponding to each capability includes an identifier of the device. In this way, the user can quickly identify a device that meets a condition (for example, a device corresponding to a to-be-used function), and then quickly select an appropriate device to establish a Wi-Fi P2P connection to this device for data transmission.

Embodiment 2: A P2P device transmits a probe request frame including capability information of the P2P device to another P2P device.

Figure 9A:
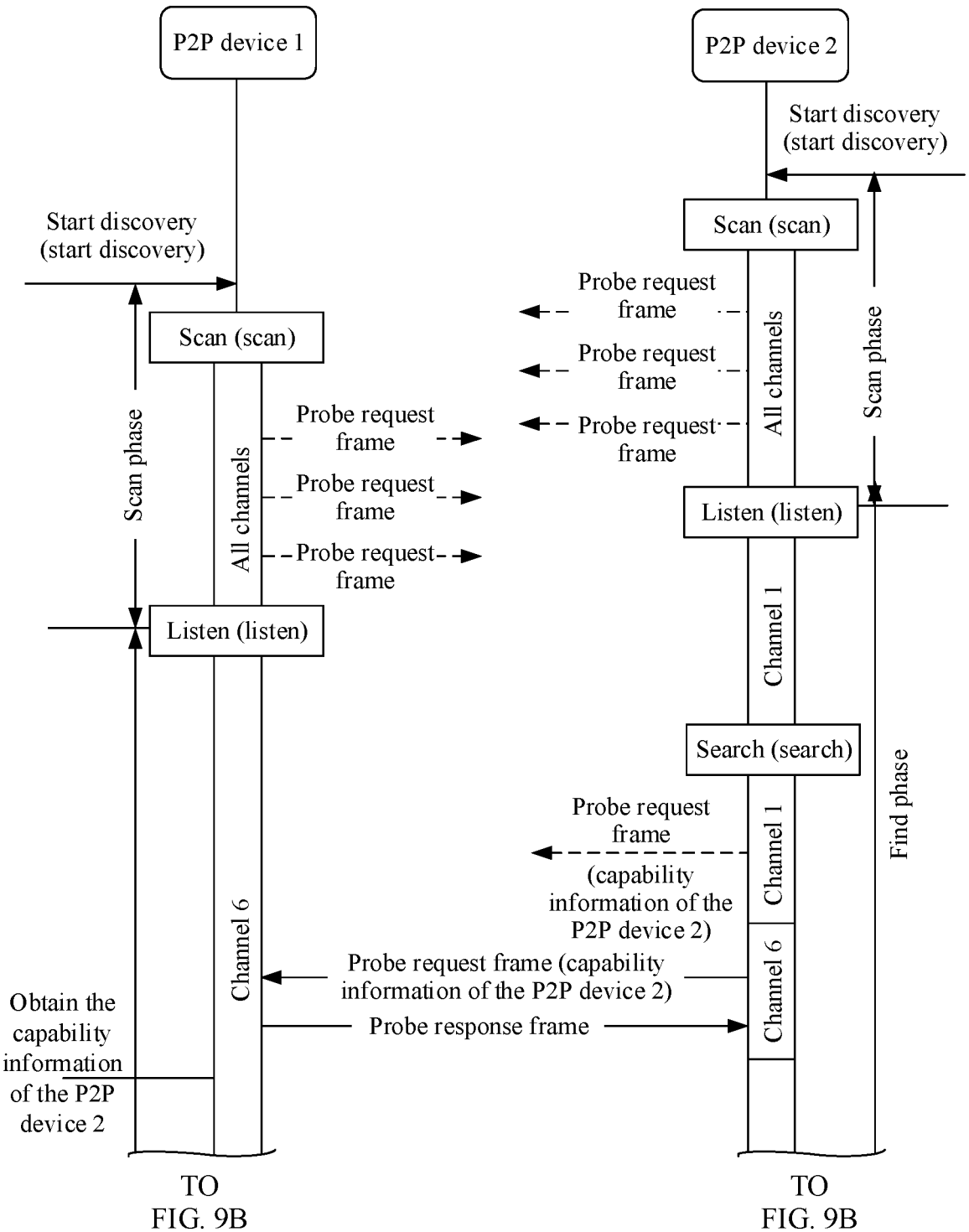
FIG. 9A and FIG. 9B are a schematic flowchart of another device capability discovery method according to an embodiment of the application.
Figure 9B:
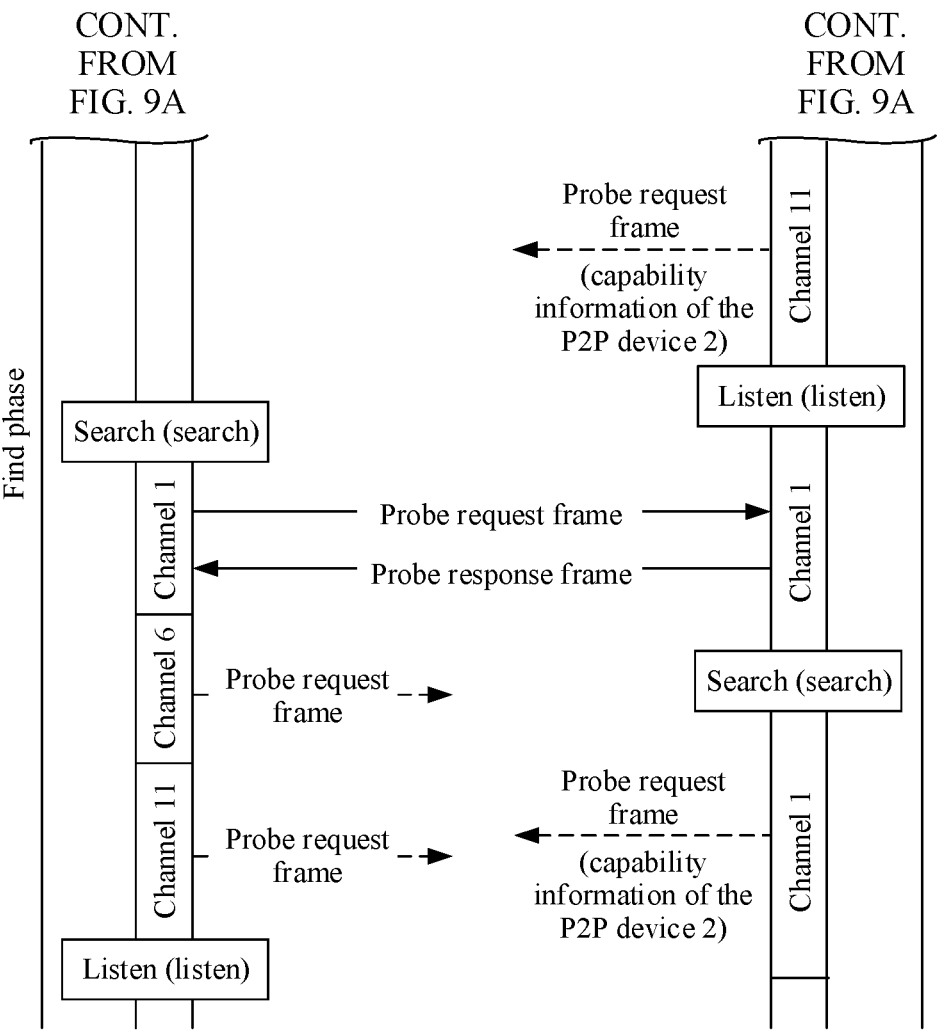

FIG. 9A and FIG. 9B are a schematic flowchart of a device capability discovery method according to an embodiment of the application. As shown in FIG. 9A and FIG. 9B, similar to the descriptions of corresponding content in the embodiment shown in FIG. 4, after P2P devices (for example, the P2P device 1 and the P2P device 2) are triggered to start discovery, the P2P devices enter the scan phase. After the scan phase ends, the P2P devices enter the find phase. In the find phase, the P2P devices switch between the search state and the listen state.

Different from the embodiment shown in FIG. 4, a probe request frame sent by the P2P device 2 in the search state on a search channel carries capability information of the P2P device 2. As shown in FIG. 9A and FIG. 9B, after entering the search state, the P2P device 2 sends, on the channel 1, the channel 6, and the channel 11, probe request frames that carry the capability information of the P2P device 2. If the P2P device 2 sends the probe request frame including the capability information of the P2P device 2 on a channel, for example, the channel 6, and the P2P device 1 is in the listen state and listens on the channel 6, the P2P device 1 may receive the probe request frame including the capability information of the P2P device 2 from the P2P device 2. After receiving the probe request frame, the P2P device 1 may associate the capability information carried in the probe request frame with an identifier of the P2P device 2 and store the association. Then, the P2P device 1 discovers the P2P device 2. That is, the P2P device 1 enters the search state, and sends probe request frames on the channel 1, the channel 6, and the channel 11. If the P2P device 1 sends the probe request frame on a channel, for example, the channel 1, and the P2P device 2 is in the listen state and listens on the channel 1, the P2P device 2 may receive the probe request frame from the P2P device 1. After receiving the probe request frame, the P2P device 2 returns a probe response frame to the P2P device 1 (different from Embodiment 1, the probe response frame may not carry the capability information of the P2P device 2). After receiving the probe response frame returned by the P2P device 2, the P2P device 1 discovers the P2P device 2. In this case, the P2P device 1 may obtain the capability information previously stored in association with the identifier of the P2P device 2, and the capability information is the capability information of the P2P device 2. After learning of the capability information of the P2P device 2, the P2P device 1 may also display the discovered device, that is, the P2P device 2, in the interface shown in FIG. 7A.

In an embodiment, an existing field of the probe request frame or a new field extended in a reserved field of the probe request frame may carry the capability information of the device. In an example, a frame structure of the probe request frame may be shown in FIG. 6, and type=00 and sub-type=0100 are included in the type field 601b. The capability information of the device may be carried in the frame body 602, for example, in the reserved field 6024 of the frame body 602, or in a reserved bit of an existing field of the frame body 602. For composition of the capability information of the device and corresponding descriptions, refer to Table 1 and corresponding descriptions. Details are not described herein again.

In addition, in the foregoing example, the P2P device 2 first discovers the P2P device 1. That is, the P2P device 1 first receives the probe request frame including the capability information of the P2P device 2, and returns a probe response frame to the P2P device 2. Then, the P2P device 1 discovers the P2P device 2. That is, the P2P device 2 receives the probe request frame sent by the P2P device 1, and the P2P device 1 receives the probe response frame from the P2P device 2. In this scenario, the P2P device 1 may first store the received capability information of the P2P device 2. Then, after discovering the P2P device 2, that is, after receiving the probe response frame from the P2P device 2, the P2P device 1 displays the identifier of the device in a device discovery list based on the stored capability information. Alternatively, in a possible scenario, the P2P device 1 first discovers the P2P device 2. That is, the P2P device 2 receives the probe request frame sent by the P2P device 1, and the P2P device 1 receives the probe response frame from the P2P device 2. Then, the P2P device 2 discovers the P2P device 1. That is, the P2P device 1 receives the probe request frame including the capability information of the P2P device 2 from the P2P device 2. In this scenario, the P2P device 1 may not display the identifier of the device in the device discovery list temporarily. Instead, after receiving the probe request frame including the capability information of the P2P device 2 from the P2P device 2, the P2P device 1 displays the identifier of the P2P device 2 in the interface shown in FIG. 7A.

In some other embodiments, the foregoing example is described by using an example in which the P2P device 2 is in the search state, and sends the probe request frame including the capability information of the P2P device 2 on the search channel. In some other embodiments, the P2P device 2 may alternatively send the probe request frame including the capability information of the P2P device 2 in the scan phase. In some other embodiments, the P2P device 2 may alternatively send the probe request frame including the capability information of the P2P device 2 on the search channel in the search state, and also send the probe request frame including the capability information of the P2P device 2 in the scan phase. In this way, the P2P device 1 can obtain the capability information of the P2P device 2 in a device discovery phase.

According to the technical solution, the P2P device sends the probe request frame including the capability information of the P2P device to the another P2P device, so that the device can obtain the capability information of the discovered device in the device discovery phase. Less time is consumed to discover capability information of a device compared with time consumed to obtain the capability information of the device through a device service discovery process after the device is discovered. In addition, after the capability information of the device is obtained, the identifier of the discovered device may be displayed in a corresponding sub-item based on the capability information of the device. A same sub-item includes identifiers of devices that support a same capability, and devices corresponding to identifiers included in different sub-items support different capabilities. In addition, when a device supports a plurality of capabilities, a sub-item corresponding to each capability includes an identifier of the device. In this way, the user can quickly identify a device that meets a condition (for example, a device corresponding to a to-be-used function), and then quickly select an appropriate device to establish a Wi-Fi P2P connection to this device for data transmission.

It should be noted that, in Embodiment 1 and Embodiment 2, an example in which the P2P device 2 uses the probe response frame or the probe request frame to carry the capability information of the P2P device 2 is used for description. In some other embodiments, the P2P device 1 may also use a probe response frame or a probe request frame to carry capability information of the P2P device 1, so that another P2P device such as the P2P device 2 obtains the capability information of the P2P device 1. Certainly, a P2P device may also use both a probe request frame and a probe response frame to carry capability information of the device. A process is similar to the process in Embodiment 1 and Embodiment 2, and details are not described herein again.

Some embodiments of the application provide a P2P device (for example, the P2P device 1 or the P2P device 2). The P2P device may include one or more processors, a memory, and a Wi-Fi module. The Wi-Fi module supports Wi-Fi P2P. The P2P device may further include a display. The memory, the display, and the Wi-Fi module are coupled to the processor. The memory is configured to store computer program code, and the computer program code includes computer instructions. When the processor executes the computer instructions, the P2P device may perform functions or operations performed by the P2P device 1 or the P2P device 2 in the method embodiments. For a structure of the P2P device, refer to the structure of the P2P device shown in FIG. 3.

Figure 10:
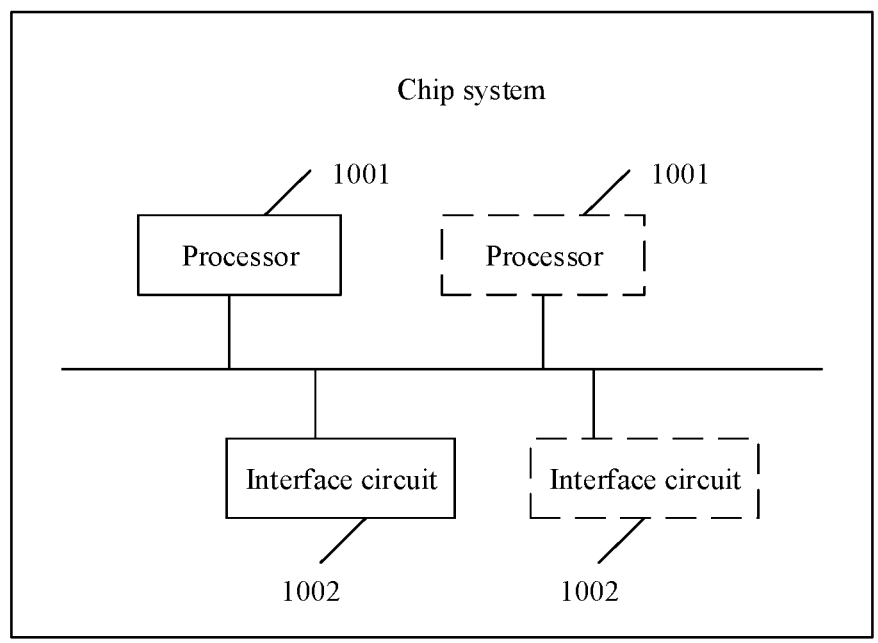
FIG. 10 is a schematic composition diagram of a chip system according to an embodiment of the application.

An embodiment of the application further provides a chip system. As shown in FIG. 10, the chip system includes at least one processor 1001 and at least one interface circuit 1002. The processor 1001 and the interface circuit 1002 may be connected to each other through a line. For example, the interface circuit 1002 may be configured to receive a signal from another apparatus (for example, a memory of a P2P device). For another example, the interface circuit 1002 may be configured to send a signal to another apparatus (for example, the processor 1001 or a display of the P2P device). For example, the interface circuit 1002 may read instructions stored in the memory, and send the instructions to the processor 1001. When the instructions are executed by the processor 1001, the P2P device may be enabled to perform the operations in the foregoing embodiments. Certainly, the chip system may further include another discrete component. This is not limited in an embodiment of the application.

An embodiment of the application further provides a computer storage medium. The computer storage medium includes computer instructions, and when the computer instructions are run on the P2P device, the P2P device is enabled to perform functions or operations performed by the P2P device in the foregoing method embodiments.

An embodiment of the application further provides a computer program product. When the computer program product runs on a computer, the computer is enabled to perform the functions or operations performed by the P2P device in the foregoing method embodiments.

The foregoing descriptions about implementations allow one of ordinary skilled in the art to understand that, for the purpose of convenient and brief description, division into the foregoing function modules is used as an example for illustration. In actual application, the foregoing functions can be allocated to different function modules and implemented according to a requirement. That is, an inner structure of an apparatus is divided into different function modules to implement all or some of the functions described above.

In the several embodiments provided in the application, it should be understood that the disclosed apparatus and method may be implemented in other manners. For example, the described apparatus embodiment is merely an example. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate components may or may not be physically separate, and components displayed as units may be one or more physical units, that is, may be located in one place, or may be distributed on a plurality of different places. Some or all of the units may be selected based on an actual requirement to achieve an objective of the solutions of the embodiments.

In addition, function units in the embodiments of the application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of the embodiments of the application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the operations of the methods in the embodiments of the application. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations of the application, but are not intended to limit the protection scope of the application. Any variation or replacement within the technical scope disclosed in the application shall fall within the protection scope of the application. Therefore, the protection scope of the application shall be subject to the protection scope of the claims.

What is claimed is:

1. A device capability discovery method, comprising:
   sending, by a first peer-to-peer (P2P) device supporting wireless fidelity (Wi-Fi) P2P, a probe request frame; and
   receiving, by the first P2P device, a probe response frame from a second P2P device, wherein the probe response frame comprises capability information of the second P2P device for a user to select an appropriate device for cooperating with the first P2P device to implement a corresponding function, wherein the capability information includes distributed capability, a shooting capability, a display capability, an audio play capability, and an audio capture capability, wherein the capability information of the second P2P device is used to indicate a capability supported by the second P2P device, and wherein the second P2P device supports the Wi-Fi P2P.

2. The method according to claim 1, the method further comprising:
displaying, by the first P2P device, an available device list, wherein the available device list comprises at least one sub-item comprising identifiers of devices discovered by the first P2P device, and wherein the devices discovered by the first P2P device comprise the second P2P device; and
displaying, by the first P2P device, an identifier of the second P2P device in the available device list based on the received capability information of the second P2P device, wherein
devices corresponding to all identifiers comprised in a same sub-item support a same capability, and wherein devices corresponding to identifiers comprised in different sub-items support different capabilities.

3. The method according to claim 2, wherein
if a device discovered by the first P2P device supports a plurality of capabilities, a sub-item corresponding to each capability comprises an identifier of the device discovered by the first P2P device.

4. The method according to claim 1, wherein
a frame body of the probe response frame comprises the capability information of the second P2P device.

5. The method according to claim 1, wherein the probe request frame comprises the capability information of the first P2P device, and the capability information of the first P2P device is used to indicate a capability supported by the first P2P device.

6. The method according to claim 5, wherein a frame body of the probe request frame comprises the capability information of the first P2P device.

7. The method according to claim 1, wherein the sending the probe request frame comprises:
sending, by the first P2P device, the probe request frame in a search state.

8. The method according to claim 1, the method further comprising:
sending, by the first P2P device, a probe request frame in a scan phase, wherein the probe request frame sent in the scan phase comprises the capability information of the first P2P device.

9. A device capability discovery method, comprising:
receiving, by a second peer-to-peer (P2P) device supporting wireless fidelity (Wi-Fi) P2P, a probe request frame from a first P2P device supporting the Wi-Fi P2P; and
sending, by the second P2P device, a probe response frame to the first P2P device, wherein the probe response frame comprises capability information of the second P2P device used to indicate a capability supported by the second P2P device for a user to select an appropriate device for cooperating with the first P2P device to implement a corresponding function, wherein the capability information includes distributed capability, a shooting capability, a display capability, an audio play capability, and an audio capture capability.

10. A first peer-to-peer (P2P) device, comprising:
a wireless fidelity (Wi-Fi) module supporting Wi-Fi P2P, and
a memory coupled to a processor to store instructions, which when executed by the processor, cause the first P2P device to perform:
sending a probe request frame; and
receiving a probe response frame from a second P2P device, wherein the probe response frame comprises capability information of the second P2P device for a user to select an appropriate device for cooperating with the first P2P device to implement a corresponding function, wherein the capability information includes distributed capability, a shooting capability, a display capability, an audio play capability, and an audio capture capability, wherein the capability information of the second P2P device is used to indicate a capability supported by the second P2P device, and wherein the second P2P device supports the Wi-Fi P2P.

11. The device according to claim 10, wherein the processor further causes the first P2P device to perform:
displaying an available device list, wherein the available device list comprises at least one sub-item comprising identifiers of devices discovered by the first P2P device, and wherein the devices discovered by the first P2P device comprise the second P2P device; and
displaying an identifier of the second P2P device in the available device list based on the received capability information of the second P2P device, wherein
devices corresponding to all identifiers comprised in a same sub-item support a same capability, and wherein devices corresponding to identifiers comprised in different sub-items support different capabilities.

12. The device according to claim 11, wherein
if a device discovered by the first P2P device supports a plurality of capabilities, a sub-item corresponding to each capability comprises an identifier of the device discovered by the first P2P device.

13. The device according to claim 10, wherein
a frame body of the probe response frame comprises the capability information of the second P2P device.

14. The device according to claim 10, wherein the probe request frame comprises the capability information of the first P2P device, and the capability information of the first P2P device is used to indicate a capability supported by the first P2P device.

15. The device according to claim 14, wherein a frame body of the probe request frame comprises the capability information of the first P2P device.

16. The device according to claim 10, wherein the sending the probe request frame comprises:
sending, by the first P2P device, the probe request frame in a search state.

17. The device according to claim 10, wherein the processor further causes the first P2P device to perform:
sending a probe request frame in a scan phase, wherein the probe request frame sent in the scan phase comprises the capability information of the first P2P device.

* * * * *